United States Patent
Khoudary

(10) Patent No.: US 6,769,690 B1
(45) Date of Patent: Aug. 3, 2004

(54) MECHANISM FOR INDEPENDENTLY MOVING SEGMENTS OF A THREE-DIMENSIONAL OBJECT AND APPLICATIONS THEREOF

(75) Inventor: Saleh Khoudary, Glasgow (GB)

(73) Assignee: International Marketing and Licensing Limited, Glasgow (GB)

(*) Notice: Subject to any disclaimer, the term of this patent is extended or adjusted under 35 U.S.C. 154(b) by 0 days.

(21) Appl. No.: 09/831,074

(22) PCT Filed: Nov. 4, 1999

(86) PCT No.: PCT/GB99/03643

§ 371 (c)(1),
(2), (4) Date: Jul. 3, 2001

(87) PCT Pub. No.: WO00/25874

PCT Pub. Date: May 11, 2000

(30) Foreign Application Priority Data

| Nov. 4, 1998 | (GB) | 9824096 |
| Dec. 21, 1998 | (GB) | 9827939 |
| Apr. 24, 1999 | (GB) | 9909351 |

(51) Int. Cl.[7] .................................................. A63F 9/08
(52) U.S. Cl. .................................................. 273/153 S
(58) Field of Search .................................. 273/153 S

(56) References Cited

U.S. PATENT DOCUMENTS

| 4,344,623 A | 8/1982 | Isobe |
| 4,540,177 A | 9/1985 | Horvath |
| 4,593,907 A | 6/1986 | Abu-Shumays et al. |
| 4,856,786 A | 8/1989 | Gyovai |
| 4,865,323 A | * 9/1989 | Heusinkveld ............ 273/153 S |
| 5,308,066 A | 5/1994 | Pataki et al. |
| 5,338,033 A | * 8/1994 | Nunez Serrano ......... 273/153 S |
| 5,566,941 A | * 10/1996 | Destics .................... 273/153 S |
| 5,779,238 A | * 7/1998 | Josa-Patermann ....... 273/153 S |
| 5,816,571 A | 10/1998 | Chen |
| 6,027,116 A | * 2/2000 | Patermann .............. 273/153 S |
| 6,217,023 B1 | 4/2001 | Kremer |
| 6,422,559 B1 | * 7/2002 | Utkin ...................... 273/153 S |

FOREIGN PATENT DOCUMENTS

| EP | 0712649 A1 | 5/1996 |
| GB | 2333046 A | 7/1999 |
| GB | 2335605 A | 9/1999 |
| WO | WO 9404236 A1 | 3/1994 |

* cited by examiner

Primary Examiner—Steven Wong
(74) Attorney, Agent, or Firm—Clifford W. Browning; Woodard, Emhardt, Moriarty, McNett & Henry LLP

(57) ABSTRACT

Apparatus for enabling parts of the surface of a three-dimensional object (1) to be moved relative to each other. Applications include orientation of instruments on the surface of e.g. a satellite or a logic puzzle. Objects with eight external segments (1, 300, 500) are disclosed and it is shown how these can be adapted to form an object with thirty-two inter-changeable segments (400). Some embodiments may also be adapted to form an object with twenty-six inter-changeable segments (100, 200).

9 Claims, 44 Drawing Sheets

Home position

Top four rotated 90° anti c/w

Right four rotated 180°

Front four rotated 180°

Back four rotated 90° clockwise

Before clipping

After clipping

Rotating top layer
Held centre layer
Held bottom layer

Rotating top layer

Held centre layer

Held bottom layer

Figure 33
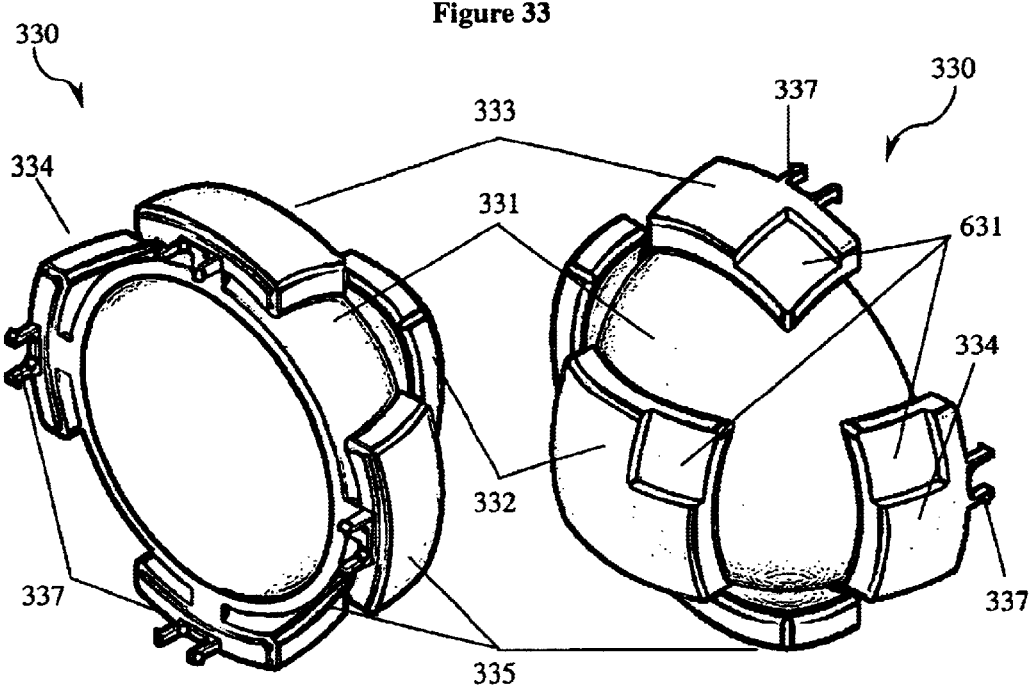
Fig. 33A    Fig. 33B
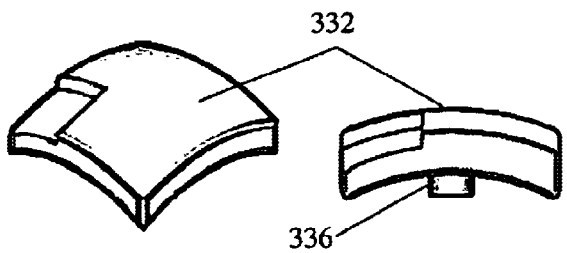 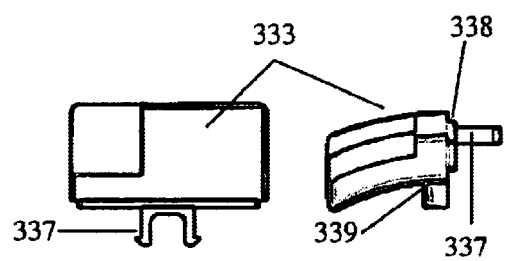
Fig. 33C    Fig. 33D    Fig. 33E    Fig. 33F
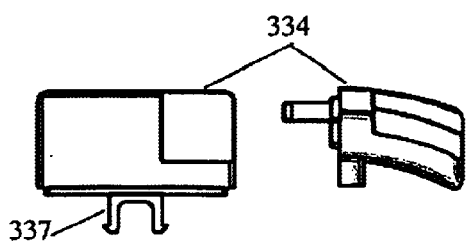 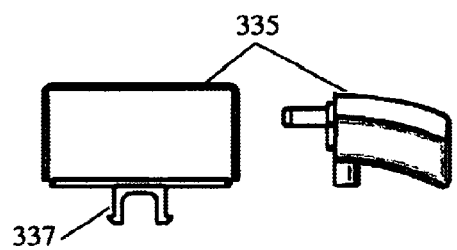
Fig. 33G    Fig. 33H    Fig. 33I    Fig. 33J

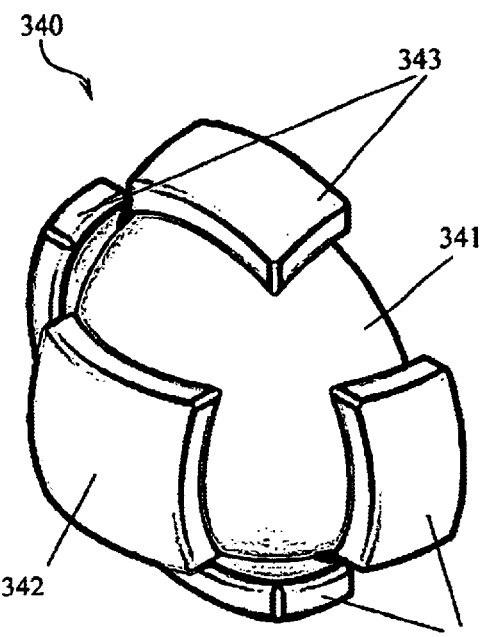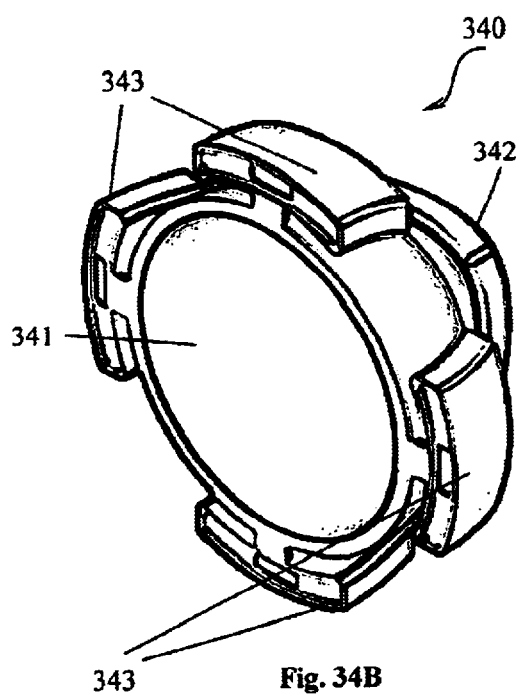
Fig. 34A Fig. 34B
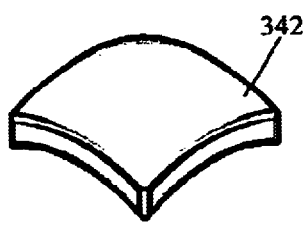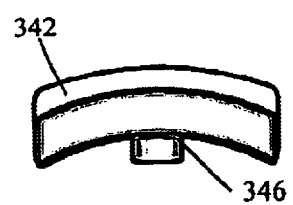
Fig. 34C Fig. 34D
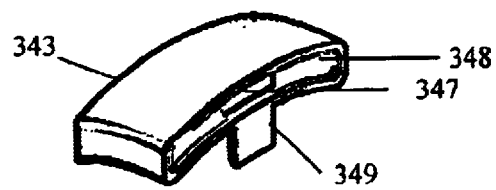
Fig. 34E

310

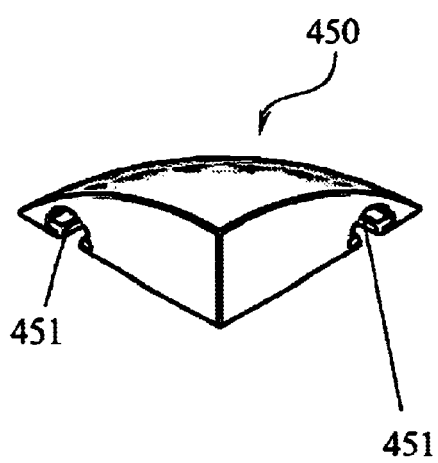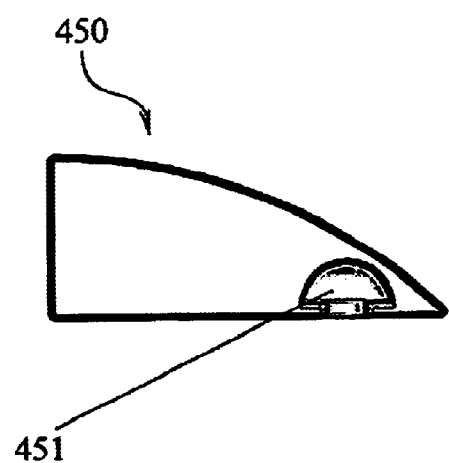
Fig. 44A
Fig. 44B

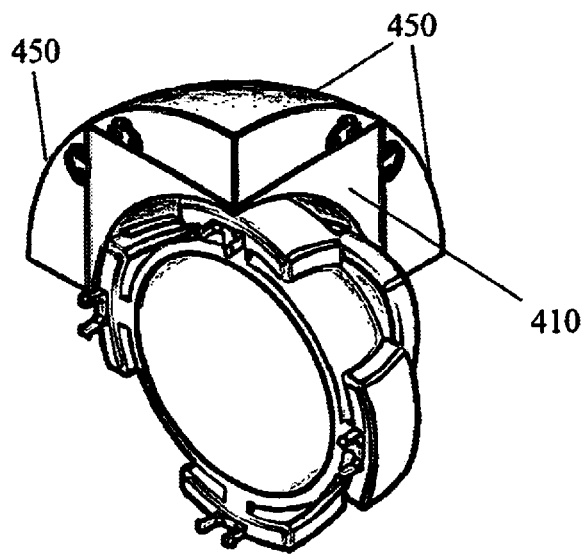
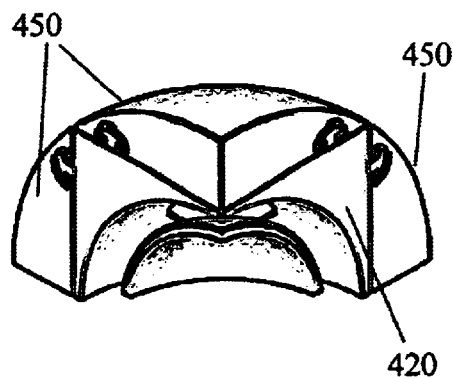
Fig. 45A
Fig. 45B
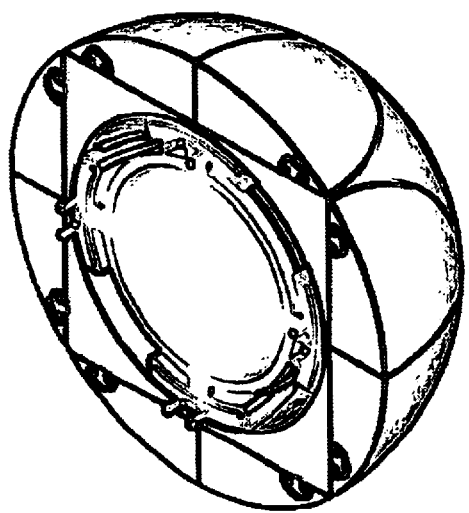
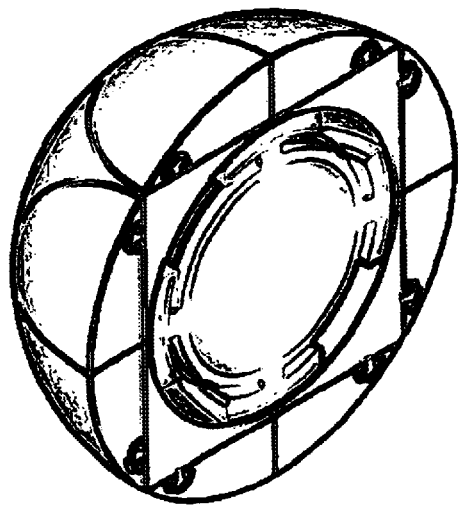
Fig. 45C
Fig. 45D

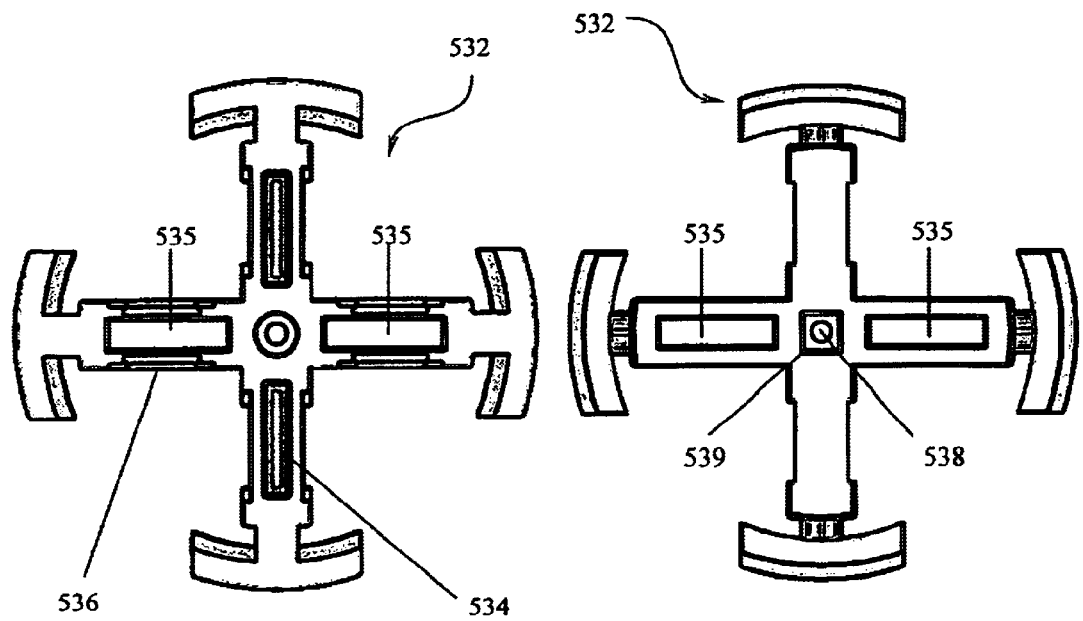
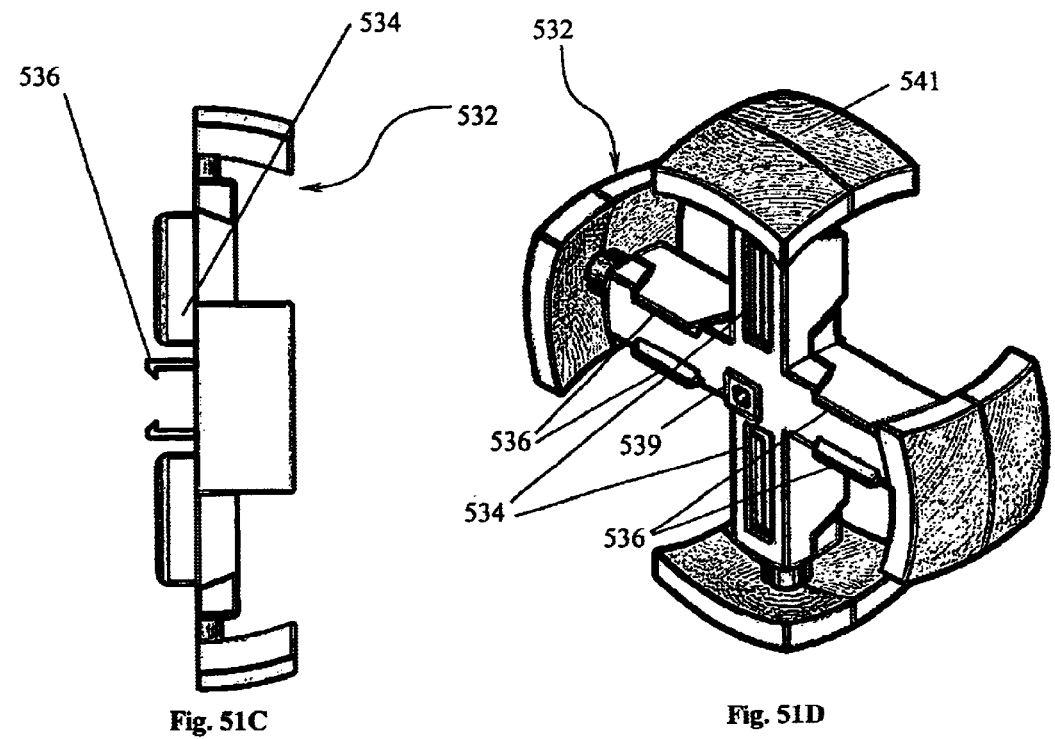
Fig. 51A  Fig. 51B
Fig. 51C  Fig. 51D

MECHANISM FOR INDEPENDENTLY MOVING SEGMENTS OF A THREE-DIMENSIONAL OBJECT AND APPLICATIONS THEREOF

This invention relates to a mechanism for providing independent movement of the outer segments of a sphere or other three-dimensional object and applications thereof, including use of said mechanism to provide a logic puzzle.

A common engineering problem, particularly in the space industry, is to move instruments exposed on the surface of an object relative to each other, altering the angular relation between them. For example, a satellite in orbit may have many external instruments such as antennae, solar panels, communications apparatus and the like all of which radiate from its outward surface and which must be held in particular orientations for particular tasks. Furthermore, the orientations may need to change dynamically and in a controlled fashion.

In space, this is difficult to achieve as any moment applied to an instrument to move it leads to an equal and opposite moment on the satellite etc. as a whole.

Therefore, moving instruments can lead to unwanted alterations in the orientation of the satellite.

It is therefore a first object of the present invention to provide a mechanism for altering the angle between and orientation of different items of apparatus on the surface of an object such as a satellite.

The motion of the instruments around a central core are found in several other applications, for example, security cameras in shops are fixed to the ceiling at one particular point and the camera must then be able to move to all solidangles and in all directions. This would typically be achieved by having one actuator which can rotate the camera around a vertical axis and a second actuator which can move the camera vertically. It is difficult to devise a means for doing this which will allow the camera to be able to move smoothly and controllably through as wide a range of solidangles as possible.

It is therefore an object of the present invention to provide a means for varying the angular relationship between sections of the surface of an object such as a sphere.

A related field which can be looked to for guidance in this area is the field of logical puzzles. Three dimensional segment puzzles are well known and various formats for these have been proposed. The best known example is that which is known as the Rubik's Cube in which one large cube is made up of a series of interlocking smaller cubes. These cubes can be moved relative to each other and rotated around a central axis. This movement is powered only by the user, but the Rubik's Cube shows some of the principles of combinatorially adjusting the relative position of segments of the surface of a three-dimensional object.

A further aim of the present invention is to devise new formats for segmented logic puzzles. In the Rubik's Cube, each of the various cubes from which it is formed has one of a series of colours applied to their outer faces and the object of the puzzle is to arrange the cubes in order to present a solid colour on each of the faces.

Various proposals have previously been made to produce a similarly segmented puzzle which is spherical. One such example is described in EP 542327. This is an eight segmented puzzle in which each segment attaches to a conical element on the central core section. Theoretically various combinations of segments can be rotated around different axes. In practice there is a conflict between the close tolerance required to prevent the puzzle coming apart and the need for a degree of movement between the segments to allow the parts to be rotated relative to one another. The puzzle in this document is also likely to become easily jammed.

Additionally with only eight playing elements, the scope of the puzzle is limited. It is therefore a further object of the present invention to provide a puzzle which is easy to use, whilst not requiring impractical tolerances in the manufacturing process. Furthermore, it is an object of the present invention to provide a three-dimensional spherical rotary puzzle which is more complex than that of the Rubik's Cube and other such puzzles which are already known.

The following description will emphasize logic puzzles but the correspondence between these puzzles and the engineering problems of altering the relative angular relation between instruments should be recalled throughout.

According to a first embodiment of the present invention there is provided apparatus for moving parts of the surface of a three-dimensional object relative to each other, the apparatus comprising a plurality of surface segments which have a part of the surface of the object thereon and a plurality of joining segments, each surface segment having a plurality of formations which slidably cooperate with complementary formations on the joining segments, the arrangement being such that the joining segments provide a means of linking the surface segments to form a three-dimensional object in which the surface segments are moveable relative to one another in such a way as to enable individual groups of surface segments to be exchanged with each other.

Preferably, the apparatus has eight surface segments and twelve joining segments.

Preferably also, the apparatus has a core element which defines axes of movement for the segments.

More preferably, the core element comprises six generally cylindrical elongate members arranged orthogonal to each other and which define axes of movement for the segments.

A surface segment may be joined fixedly to neighbouring joining segments.

Typically, one surface segment is held in a fixed relation to the core element.

The joining segments may have a part of the surface of the object thereon.

The elongate members which comprises the core element may have a part of the surface of the object thereon.

The surface segments may be configured to each receive three outermost segments which have part of the surface of the object thereon, the outermost segments being adapted to cooperate with adjacent outermost surface segments and thereby form a circular track around which the outermost segments may move.

According to a second aspect of the present invention there is provided a puzzle comprising apparatus according to the first aspect above wherein parts of the surface of the object have pattern elements thereon.

According to a third aspect of the present invention, there is provided a machine for controllably orientating a plurality of devices, the machine comprising apparatus according to the first aspect above wherein the devices are mounted on parts of the surface of the object and there are further provided means for controllably urging individual segments to move relative to each other.

According to a fourth aspect of the present invention there is provided apparatus for moving parts of the surface of a three-dimensional object relative to each other, the apparatus comprising a core and a plurality of external segments, wherein the external segments have formations thereon arranged to slidably cooperate with corresponding formations on the core, in which the external segments are moveable relative to one another in such a way as to enable individual groups of external segments to be exchanged with each other.

Preferably, the core comprises a plurality of core tops and the external segments have means for slidably cooperating with the core tops.

Preferably also, the external segments have an inner and outer shell connected by a joining piece, wherein the inner shell and outer shell are adapted to hold edges of the core tops therebetween.

Typically, eight external segments are provided.

The inner and outer shell of a joining piece may be separably joined and urged together by a biasing means.

Preferably, the inner and outer shell of a joining piece, when together, is less than the thickness of a core top.

Preferably also, a core top has a recess adapted such that when the external segments are moved into a home position, the biasing means urges the inner and outer shells to cooperate with the recess and so make an audible and/or tactile click.

Preferably also, an external segment is fixed in position relative to the core.

The external segments may be configured to each receive three outermost segments which have part of the surface of the object thereon, the outermost segments being adapted to cooperate with adjacent outermost surface segments and thereby form a circular track around which the outermost segments may move.

According to a fifth aspect of the present invention, there is provided a puzzle comprising apparatus according to the fourth aspect above wherein parts of the surface of the object have pattern elements thereon.

According to a sixth aspect of the present invention, there is provided a machine for controllably orientating a plurality of devices, the machine comprising apparatus according to the fourth aspect above wherein the devices are mounted on parts of the surface of the object and there are further provided means for controllably urging individual segments to move relative to each other.

Embodiments of the present invention will now be described, by way of example, with reference to the accompanying drawings, in which:

FIGS. 1a–c are, respectively, isometric, top and bottom views of the 3D spherical rotary puzzle in accordance with the present invention;

FIG. 2 is an exploded isometric view as seen from a south-easterly point;

FIGS. 3a–b are respectively isometric and right side views of the primary external segment of the 3D puzzle;

FIGS. 4a–b are respectively isometric and right side views of the secondary external segments of the 3D puzzle;

FIGS. 5a–d are respectively, isometric, right, front and back views of a joining plate of the 3D puzzle;

FIGS. 6a–b are isometric views of a core section of the 3D puzzle;

FIGS. 6c–d are isometric views showing the co-operation of the core with the external and joining elements;

FIGS. 7a–b are partially cut-away views illustrating the relationship between all the parts;

FIGS. 8a–e illustrate successive stages in assembly of the puzzle;

FIGS. 9a–e illustrate the various rotational capabilities of the 3D puzzle;

FIGS. 10a–b illustrates the manner in which the parts clip together;

FIG. 11 provides a view of a 3D puzzle having an alternative surface decoration;

FIGS. 12a–c are respectively isometric, top and bottom views of an alternative 3D spherical puzzle in accordance with the present invention;

FIG. 13 is an exploded isometric view of the puzzle of FIG. 12;

FIGS. 14a–b illustrate different views of an external segment of the puzzle of FIG. 12;

FIGS. 15a–d illustrate respectively isometric, side, front and back views of a joining plate of the puzzle of FIG. 12;

FIGS. 16a–b are front and bottom views of a core top element of the puzzle of FIG. 12;

FIGS. 17a–d are four different views illustrating the relationship between the core and the other elements of the puzzle of FIG. 12;

FIGS. 18a–c illustrate three examples of the top layer being rotated 90° clockwise in the puzzle of FIG. 12;

FIGS. 19a–b illustrates an isometric south-east view of an alternative decoration of the puzzle of FIG. 12 before and after partial rotation;

FIG. 20 is an exploded isometric view of the main components of an improved twenty-six piece puzzle as seen from a south-easterly view-point;

FIGS. 21a–c are isometric, bottom and side view of core top caps in the puzzle of FIG. 20;

FIGS. 22a–c are isometric, bottom and cross section view of core tops in the puzzle of FIG. 20;

Figure 20:
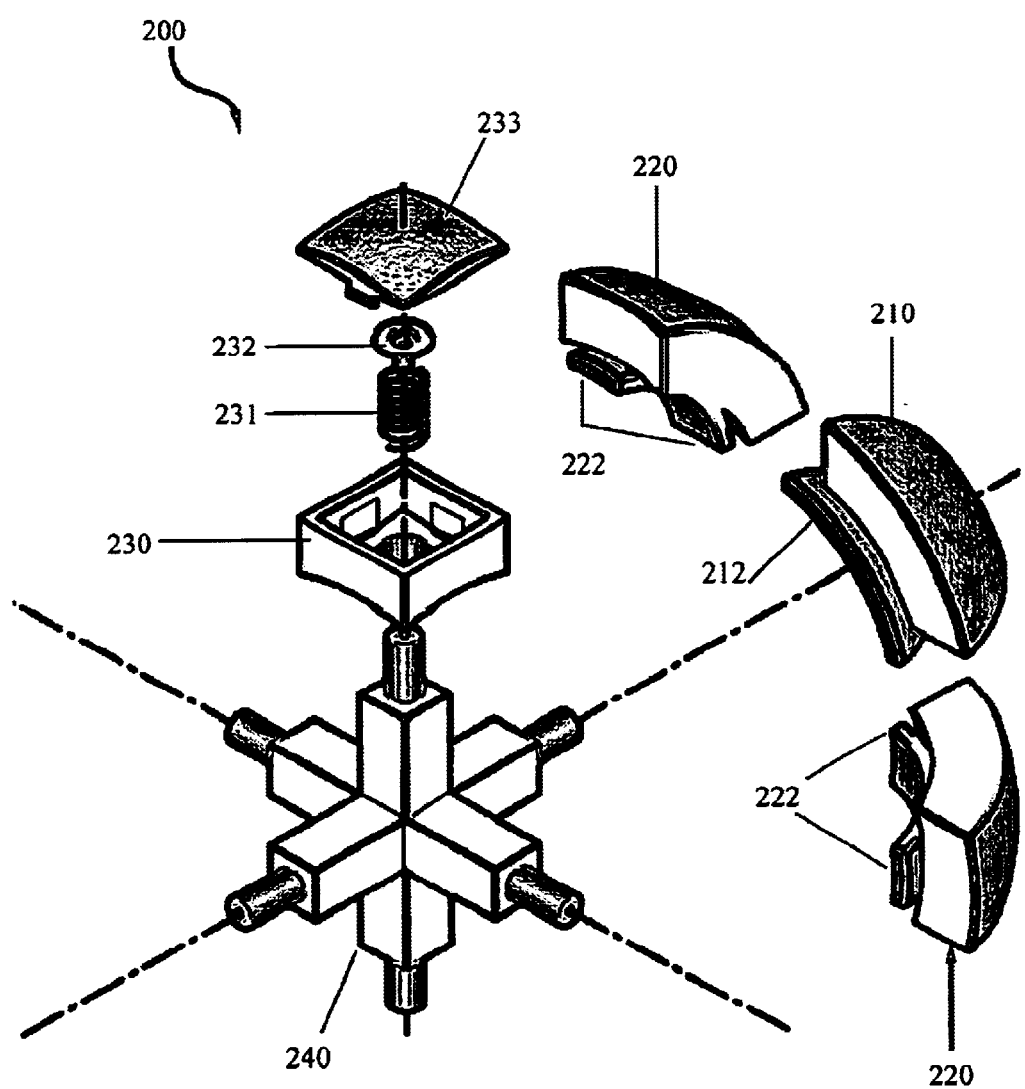
Figure 25A:
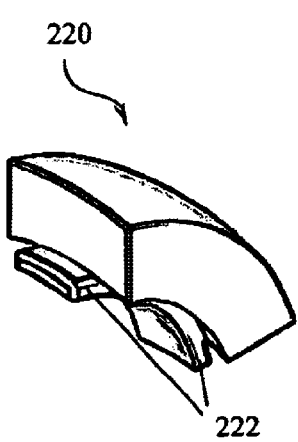
Figure 25B:
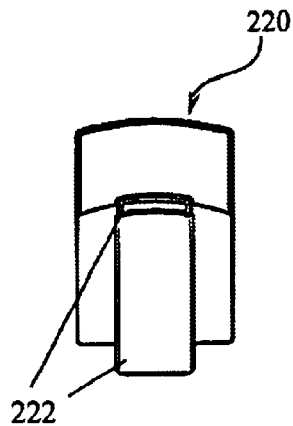
Figure 25C:
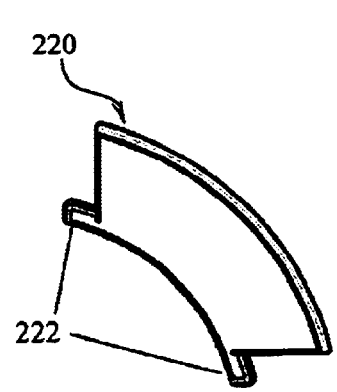
Figure 26A:
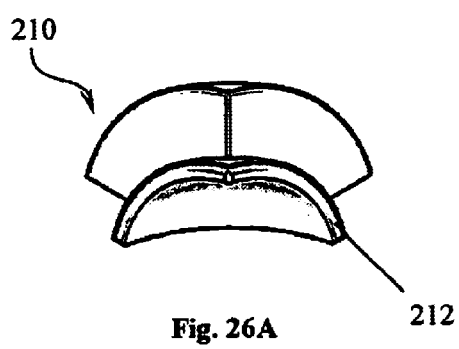
Figure 26B:
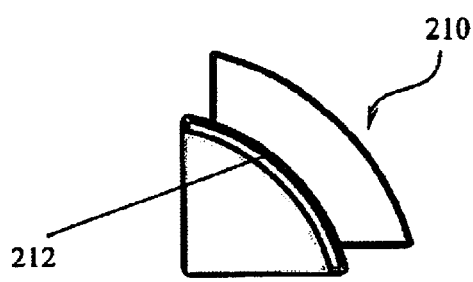
Figure 27:
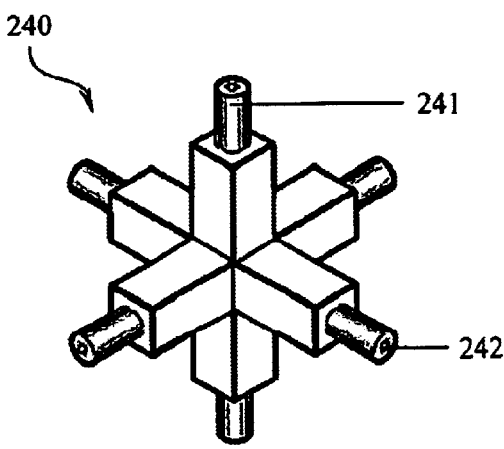
Figure 28A:
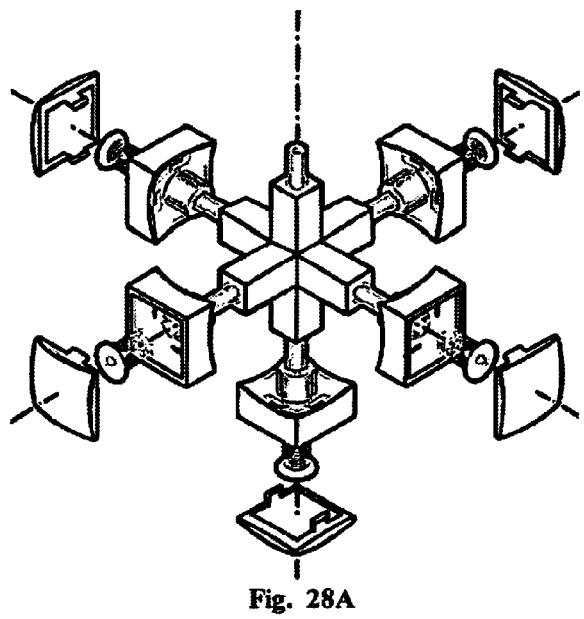
Figures 28B, 28C, 28D:
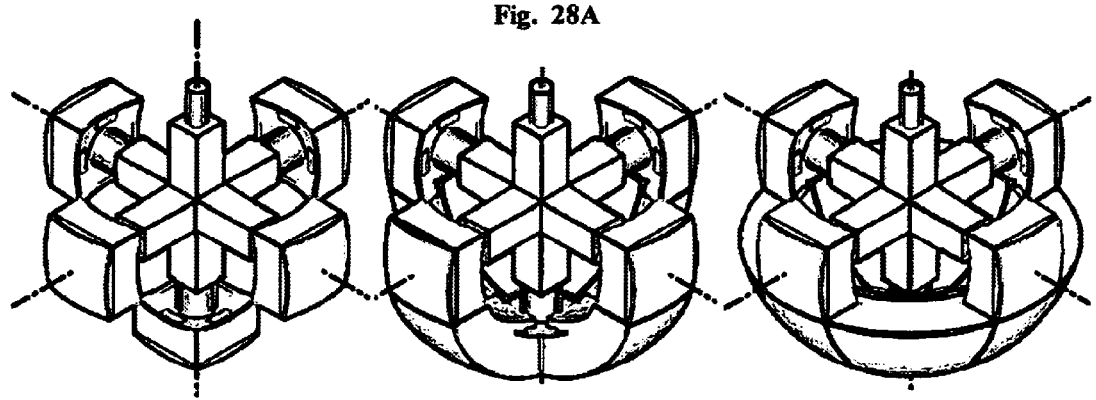
Figures 28E, 28F, 28G:
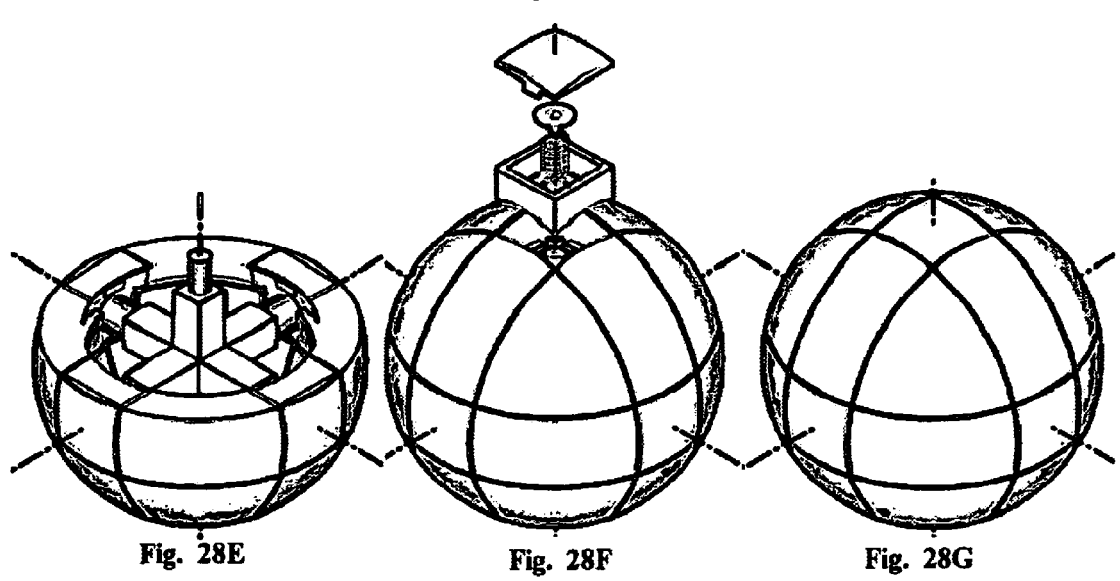
Figure 29A:
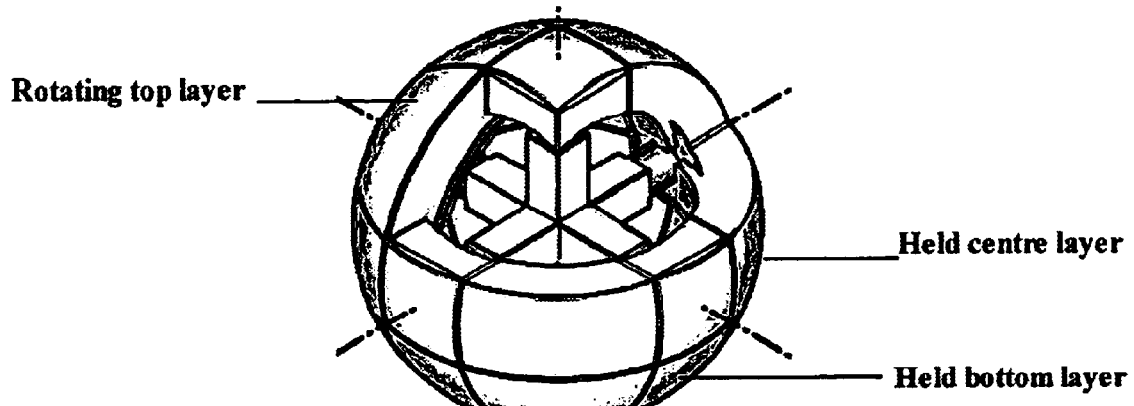
Figure 29B:
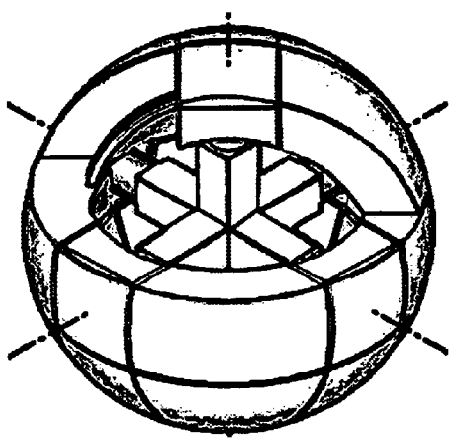
Figure 29C:
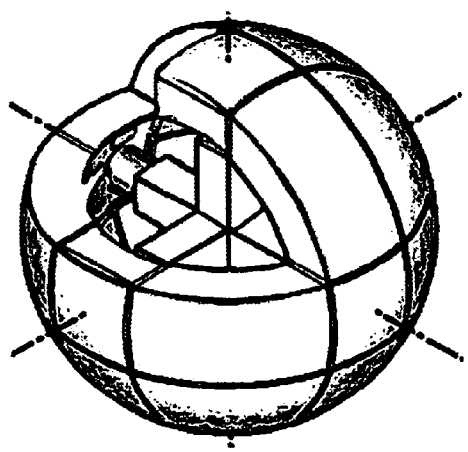

FIGS. 25a–c are respectively isometric, bottom and side view of joining plates in the puzzle of FIG. 20;

FIGS. 26a and 26b are respectively isometric and side view of external segments in the puzzle of FIG. 20;

FIG. 27 is an isometric view of a core in the puzzle of FIG. 20;

FIGS. 28a–28g illustrates various stages of assembly of the puzzle in FIG. 20;

FIGS. 29a to 29c show examples of the rotational capabilities of the segments in the puzzle of FIG. 20.

Figure 30:
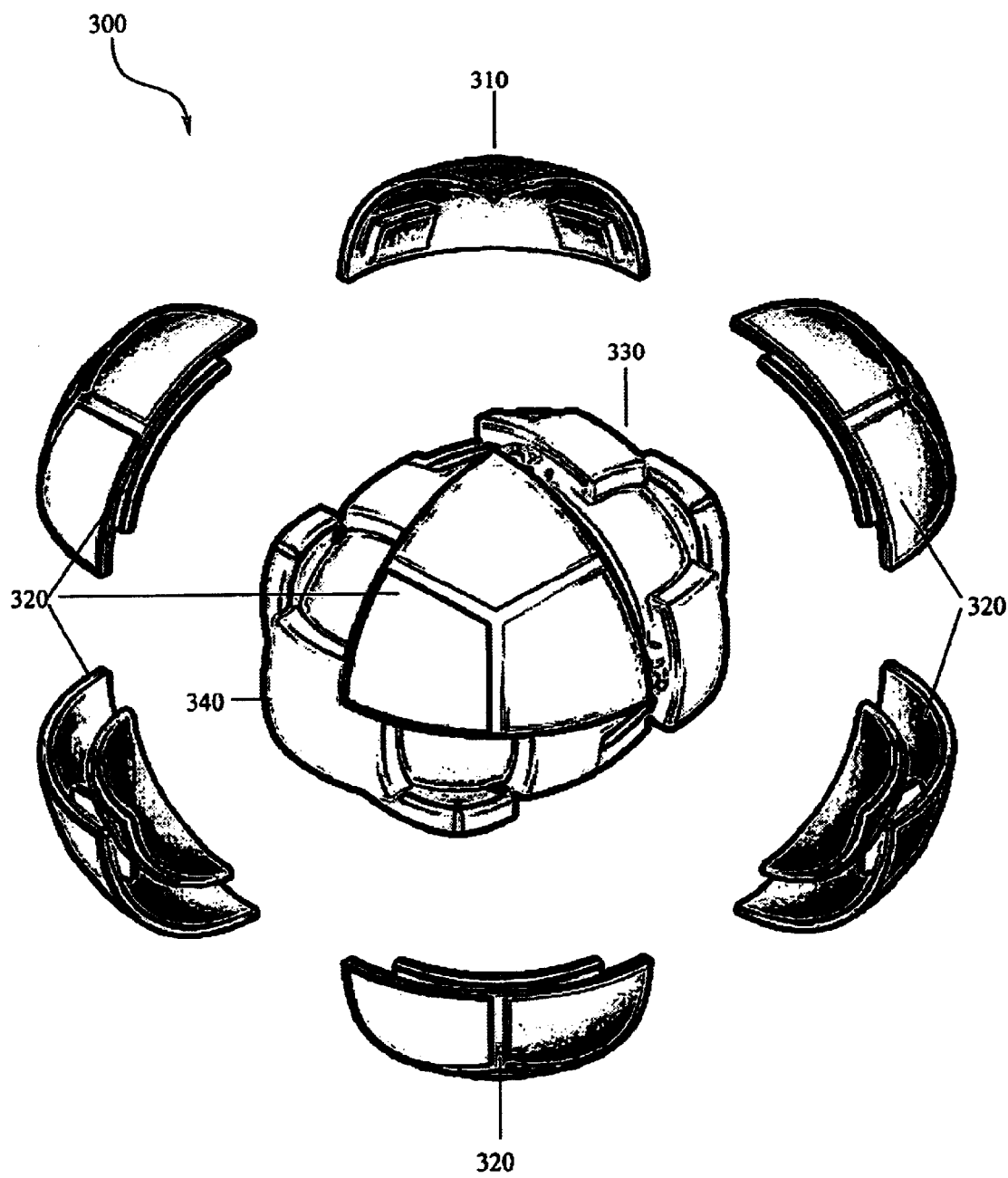
Figure 31A:
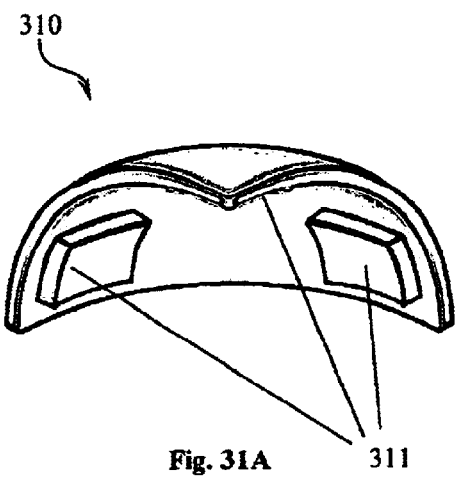
Figure 31B:
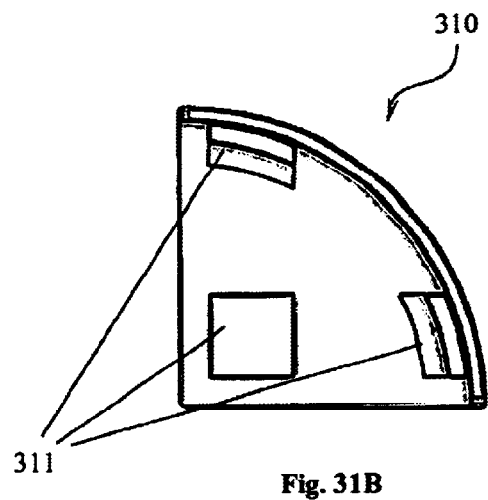
Figure 32A:
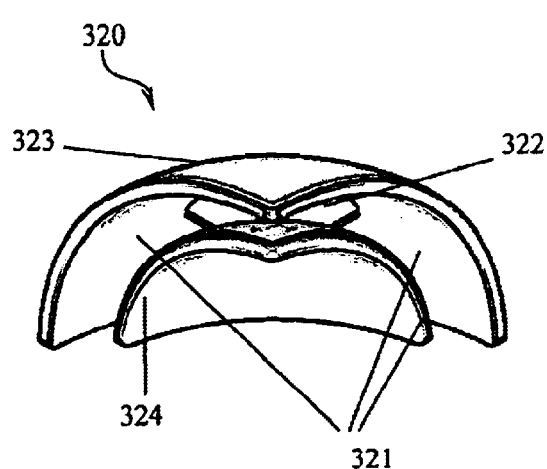
Figure 32B:
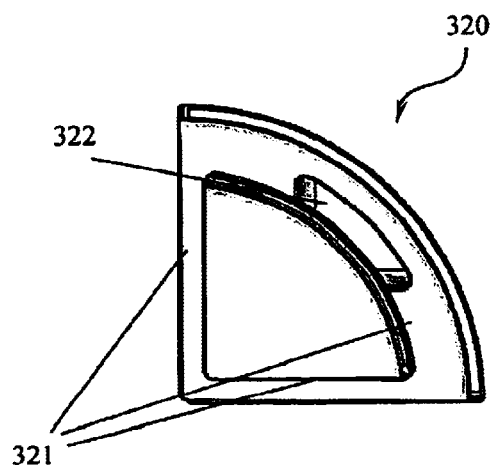
Figure 36:
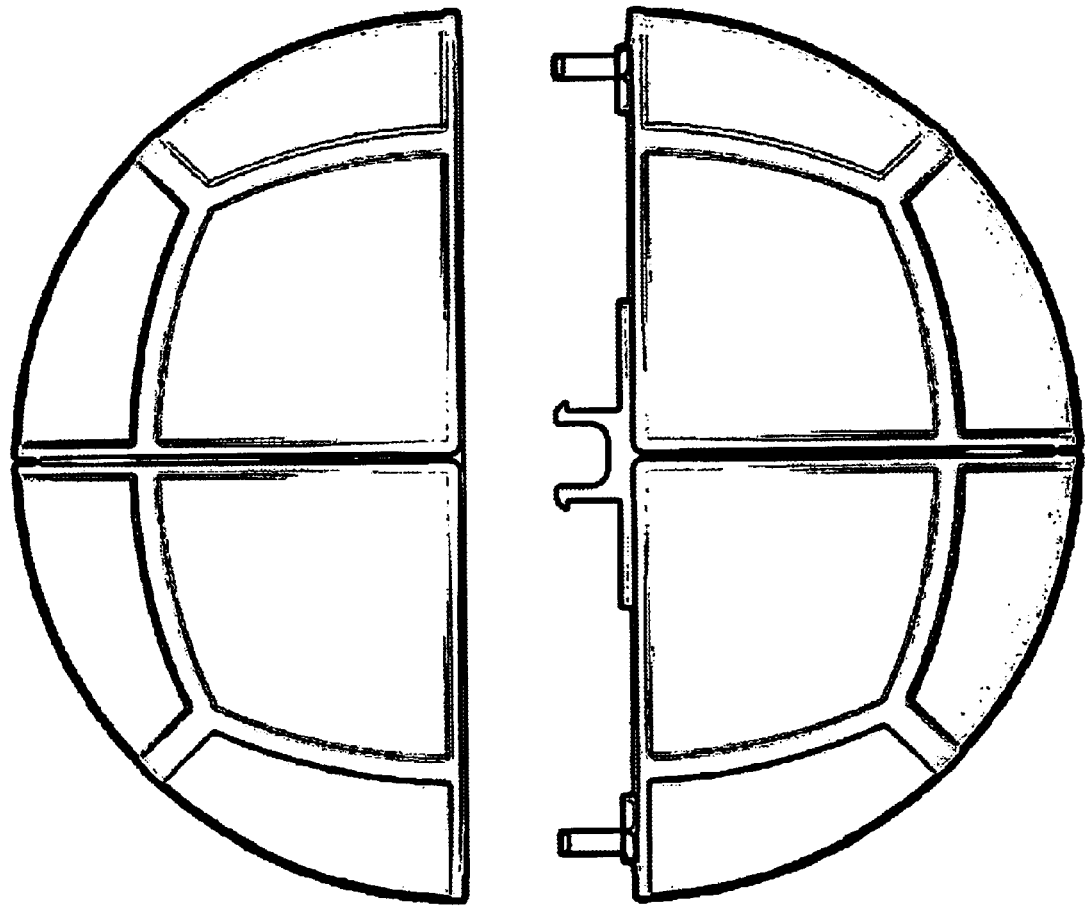
Figure 37A:
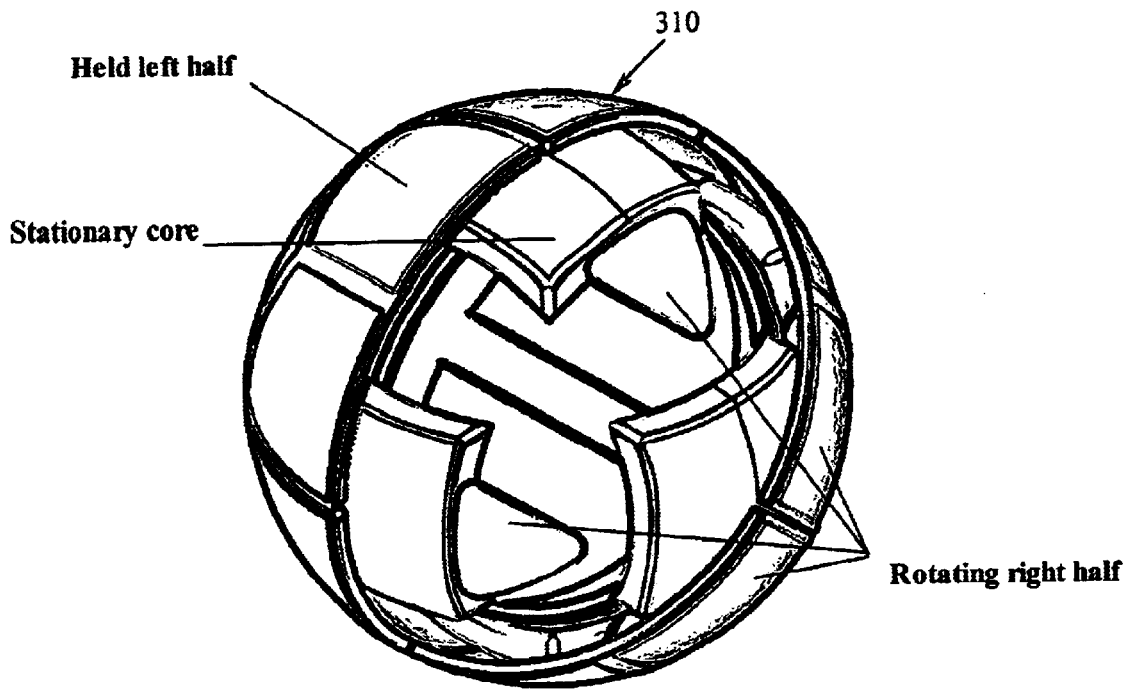
Figure 37B:
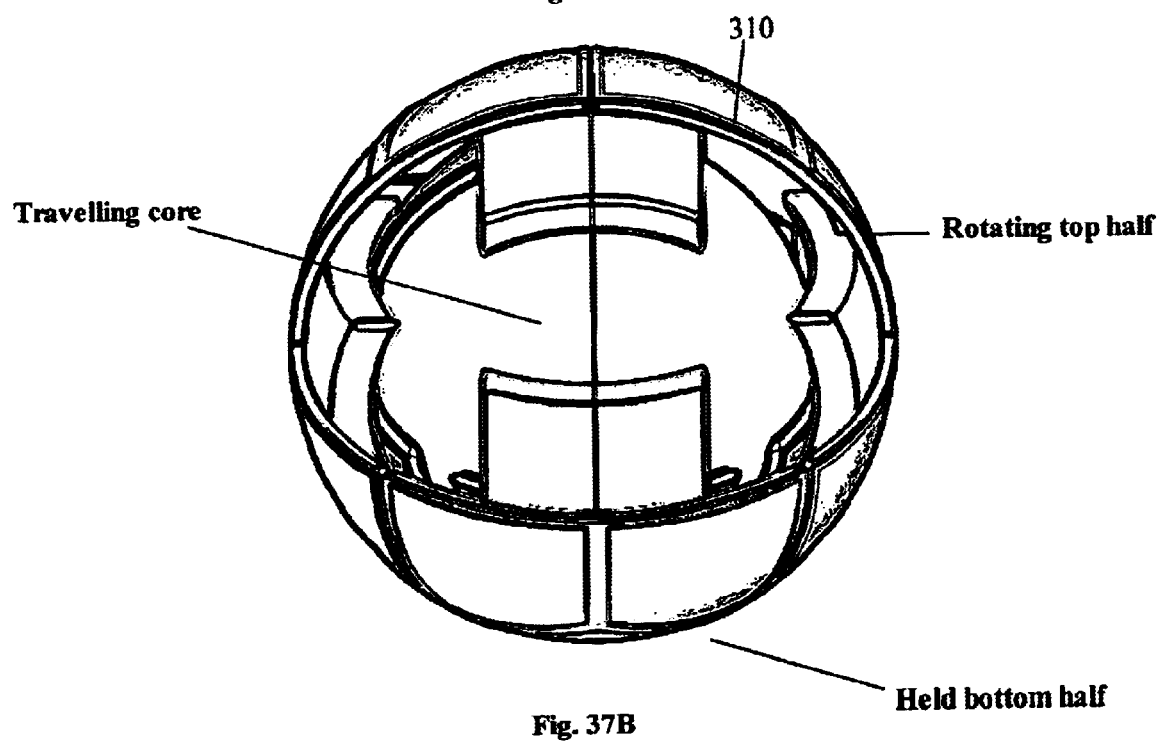
Figure 38A:
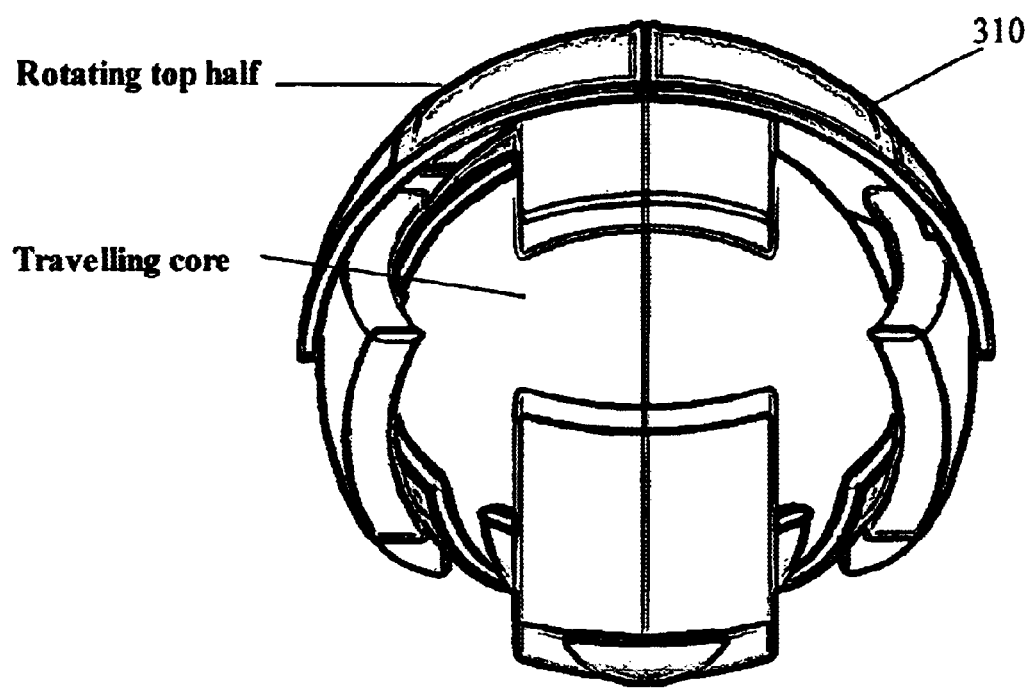
Figure 38B:
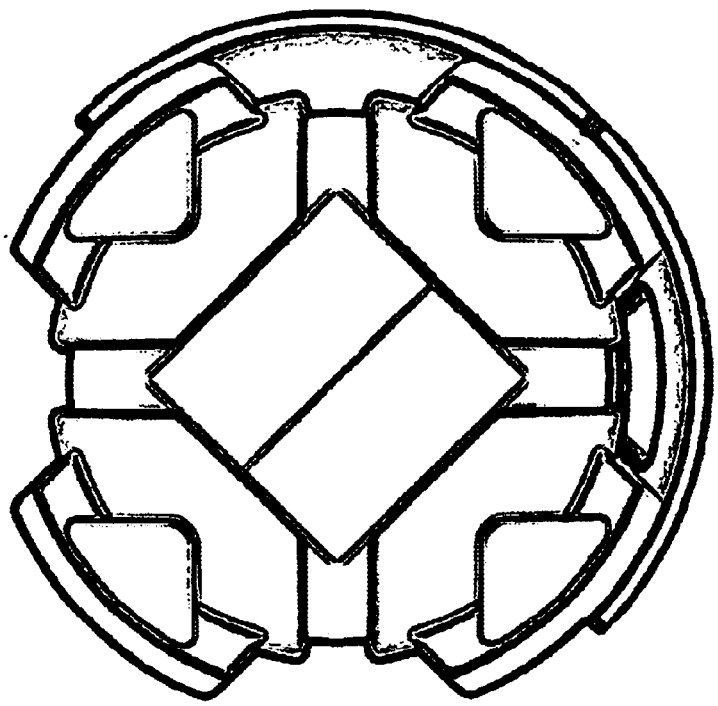
Figure 39A:
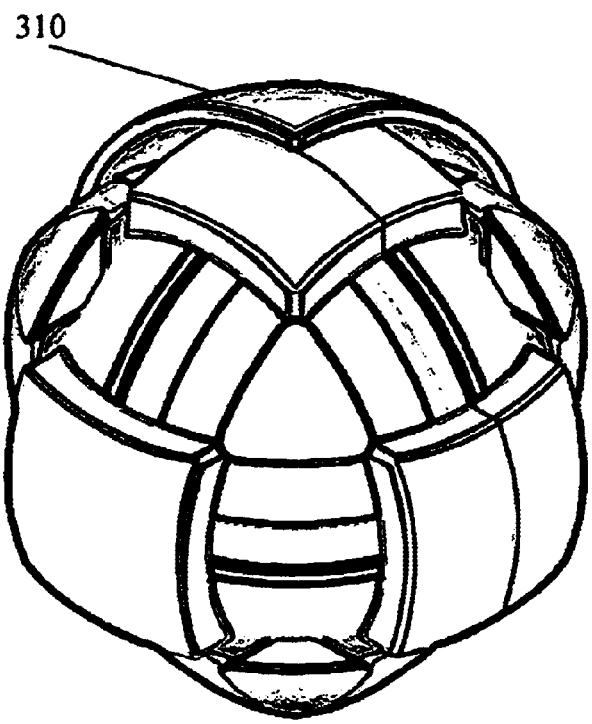
Figure 39B:
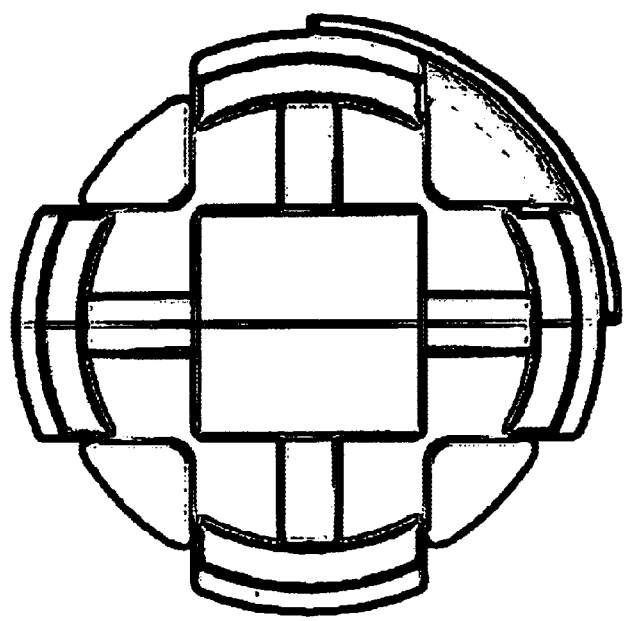
Figure 40:
Figure 41:
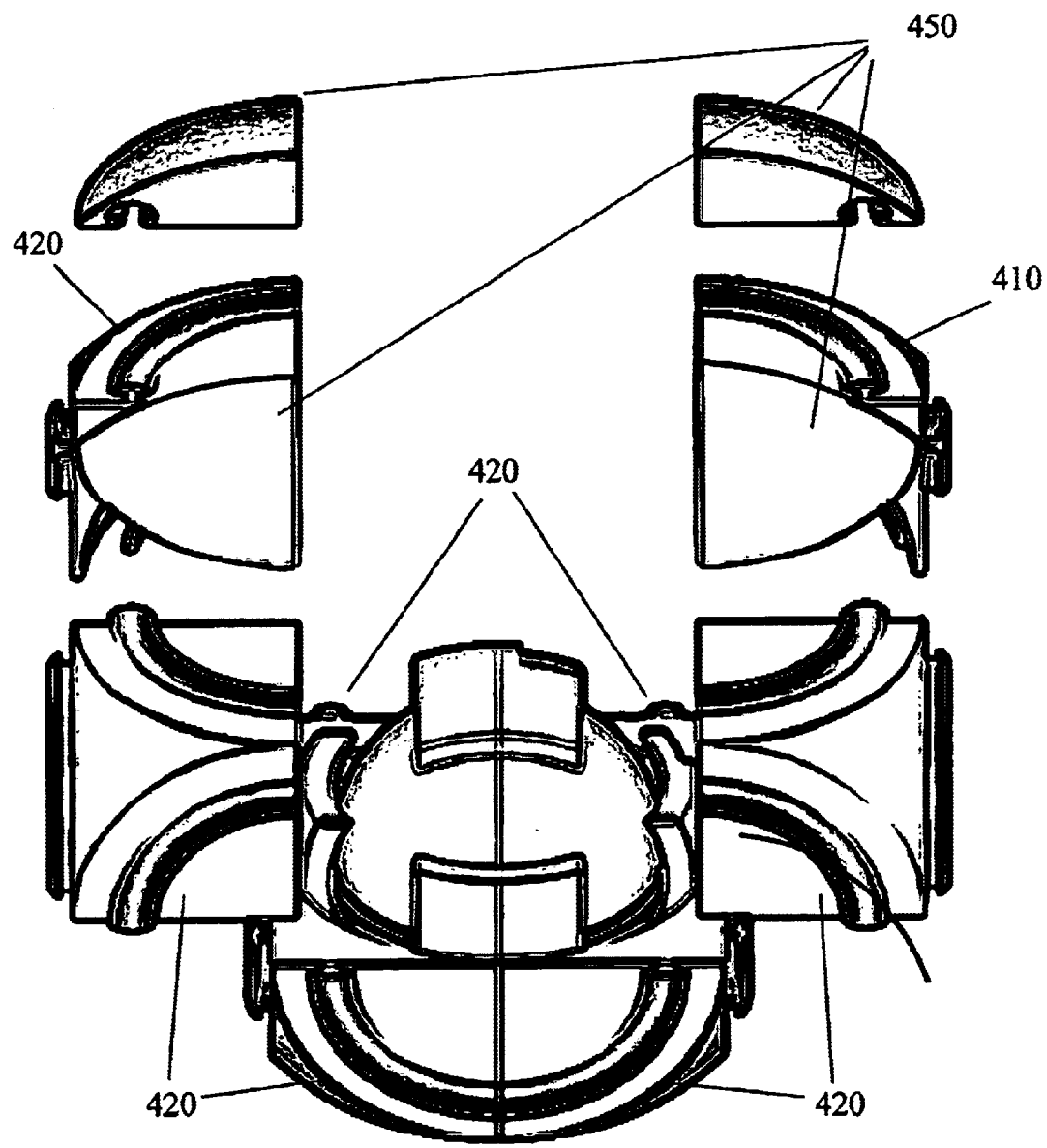
Figure 42A:
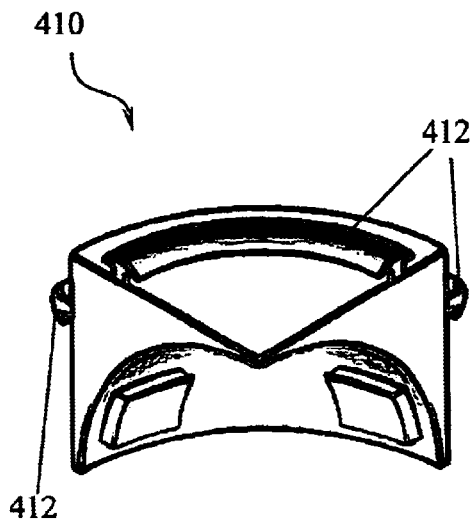
Figure 42B:
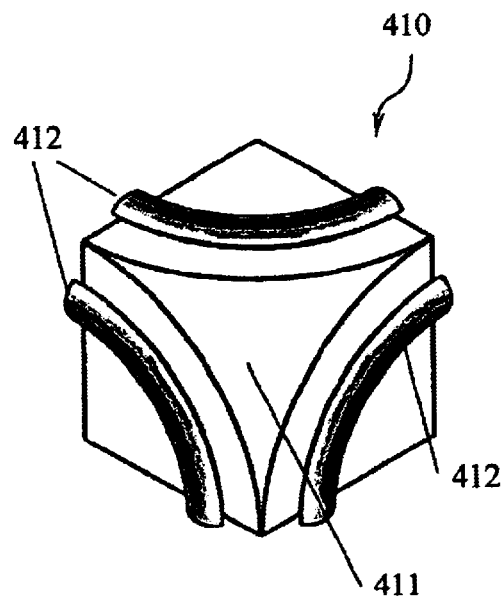
Figure 43A:
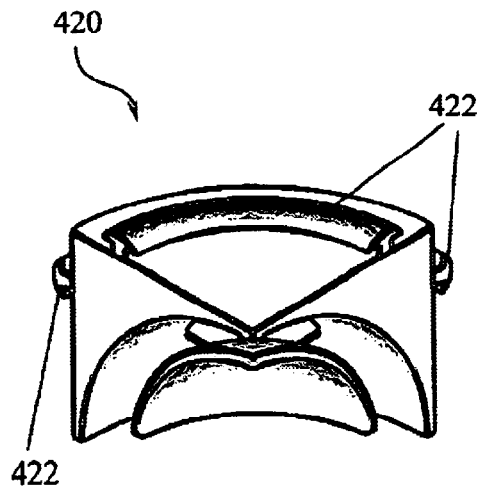
Figure 43B:
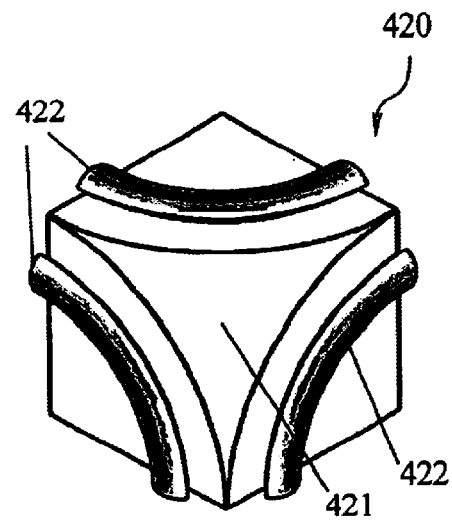
Figure 46A:
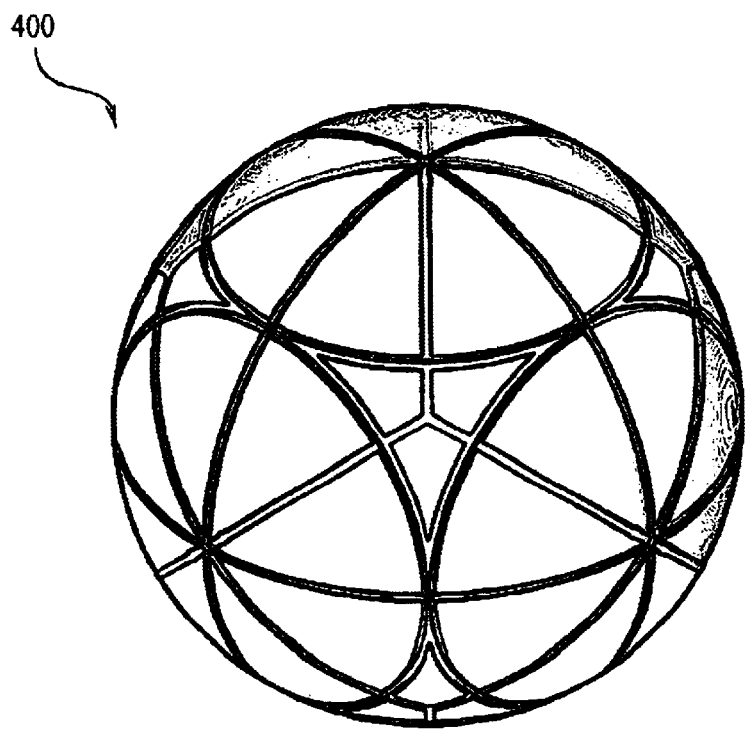
Figure 46B:
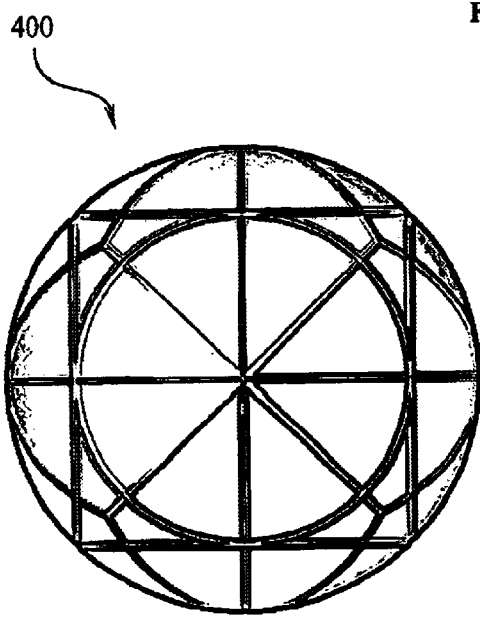
Figure 46C:
Figures 47A, 47B, 47C:
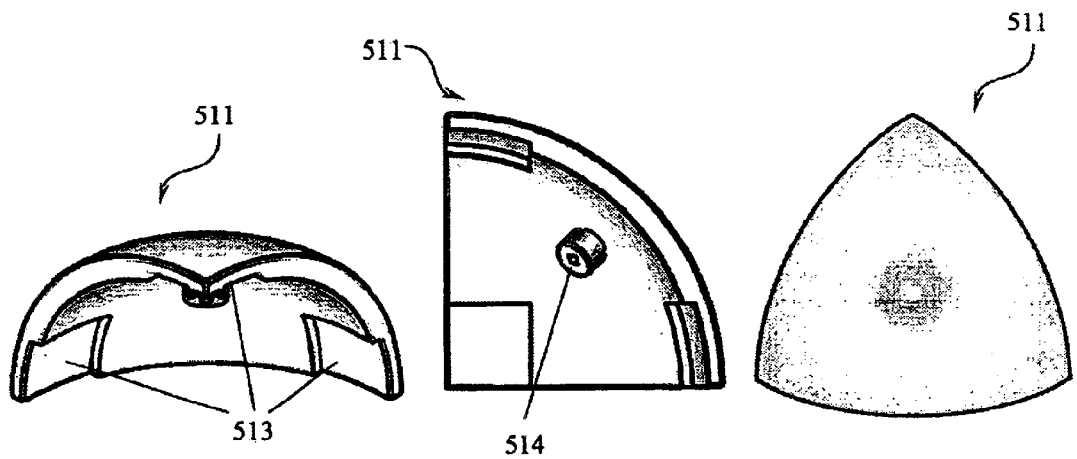
Figures 48A, 48B, 48C:
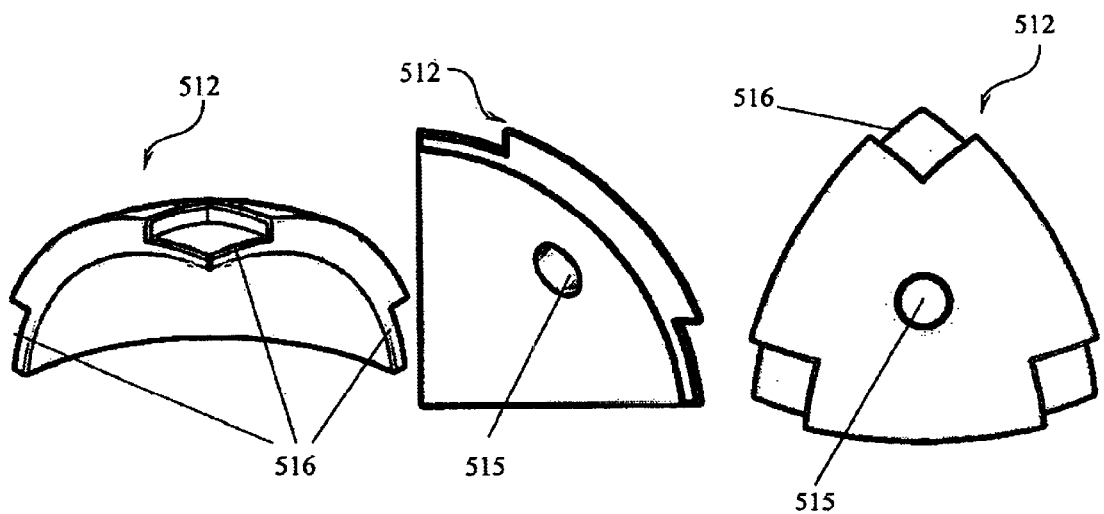
Figures 49A, 49B, 49C:
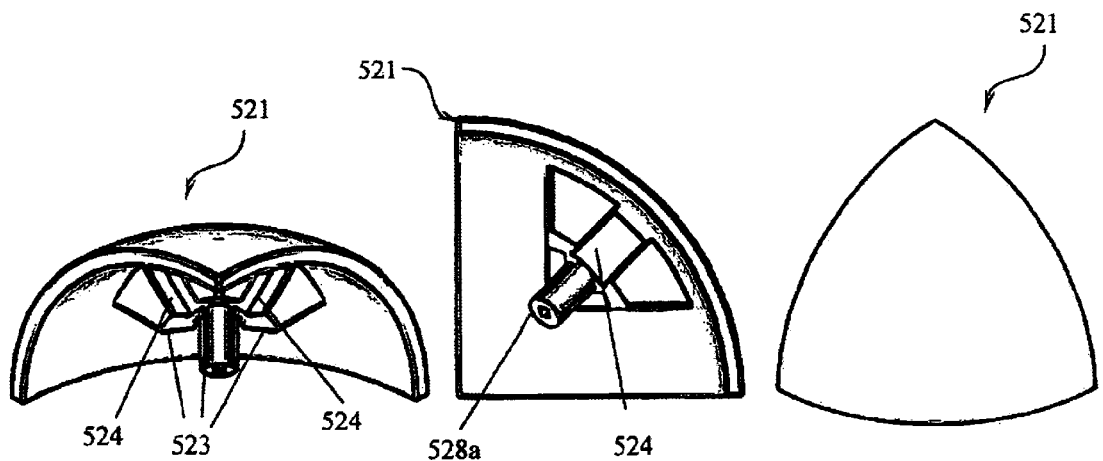
Figures 50A, 50B, 50C:
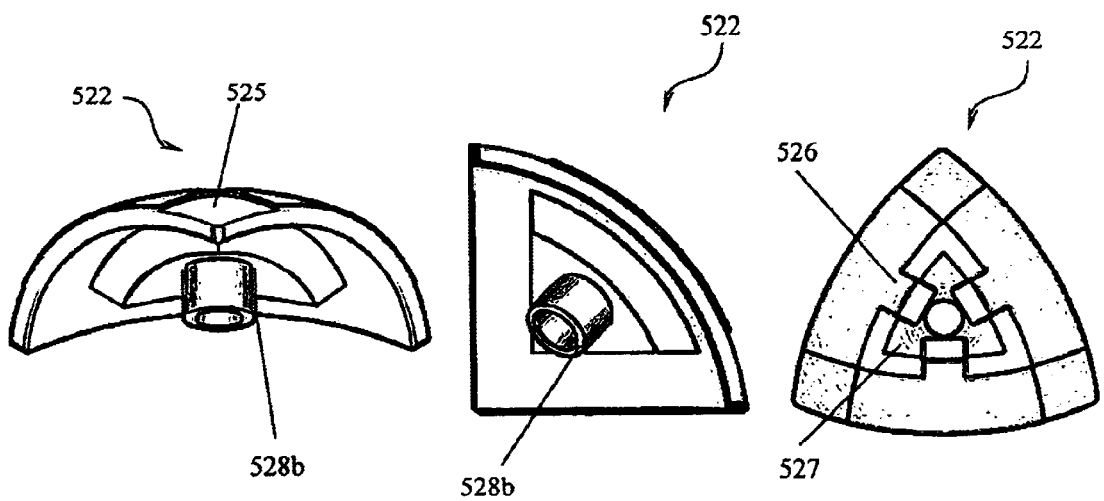
Figure 52A:
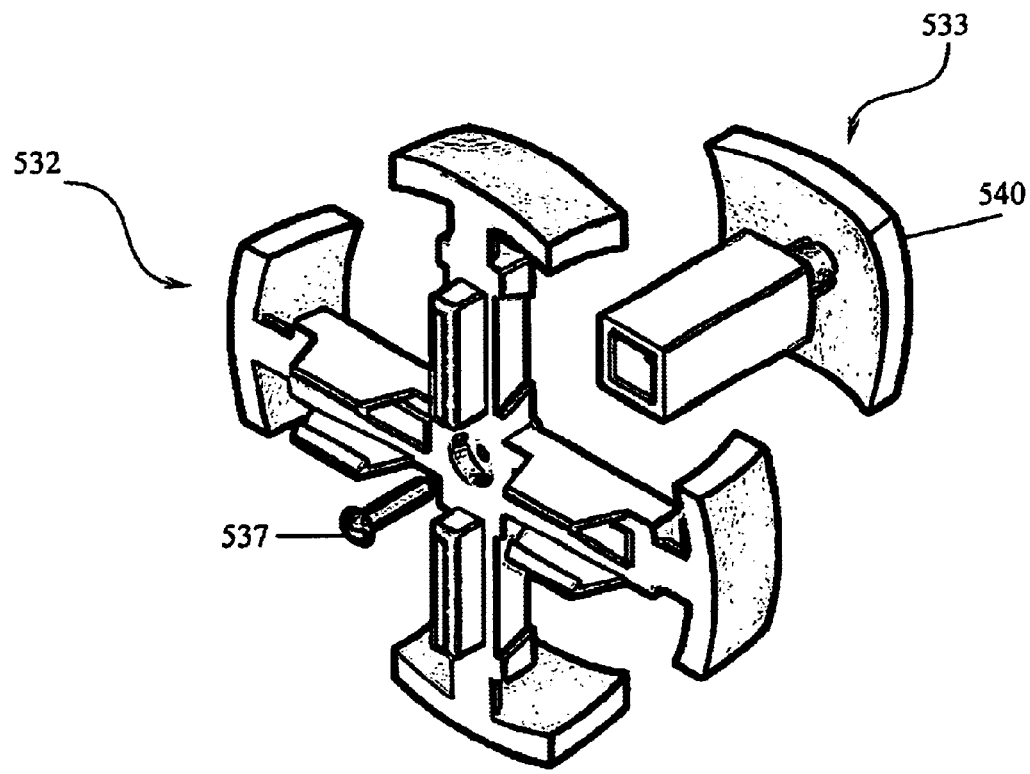
Figure 52B:
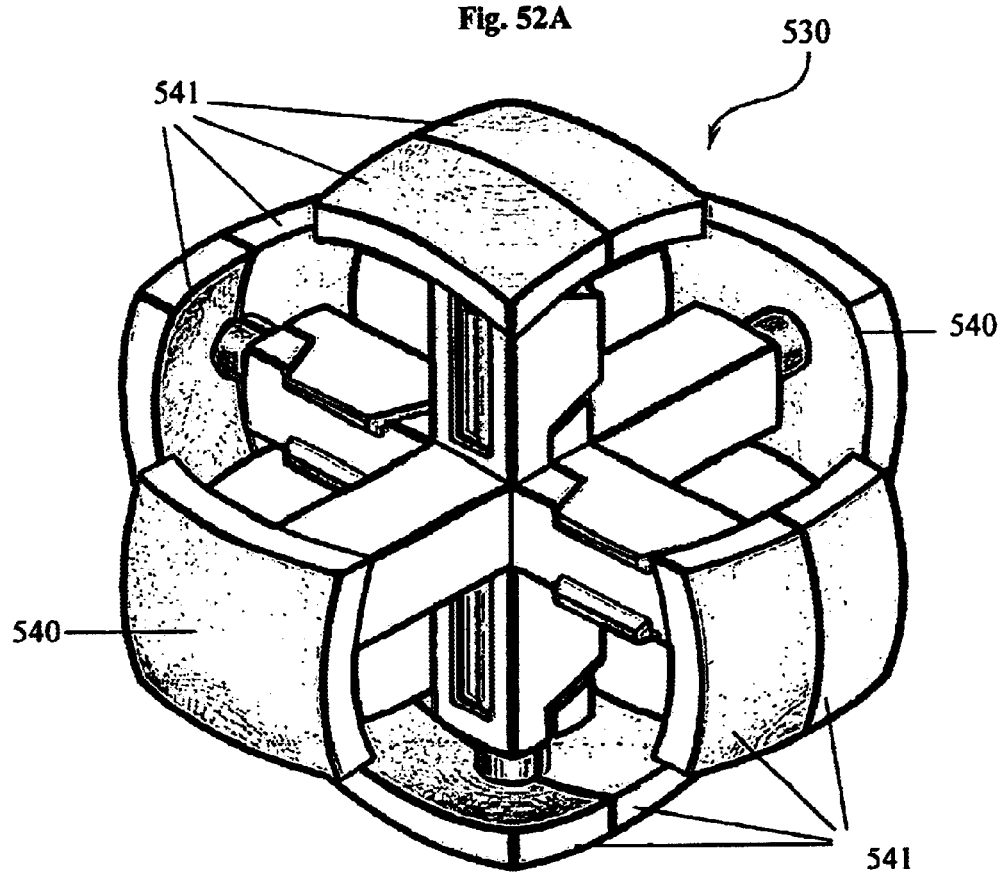
Figure 53:
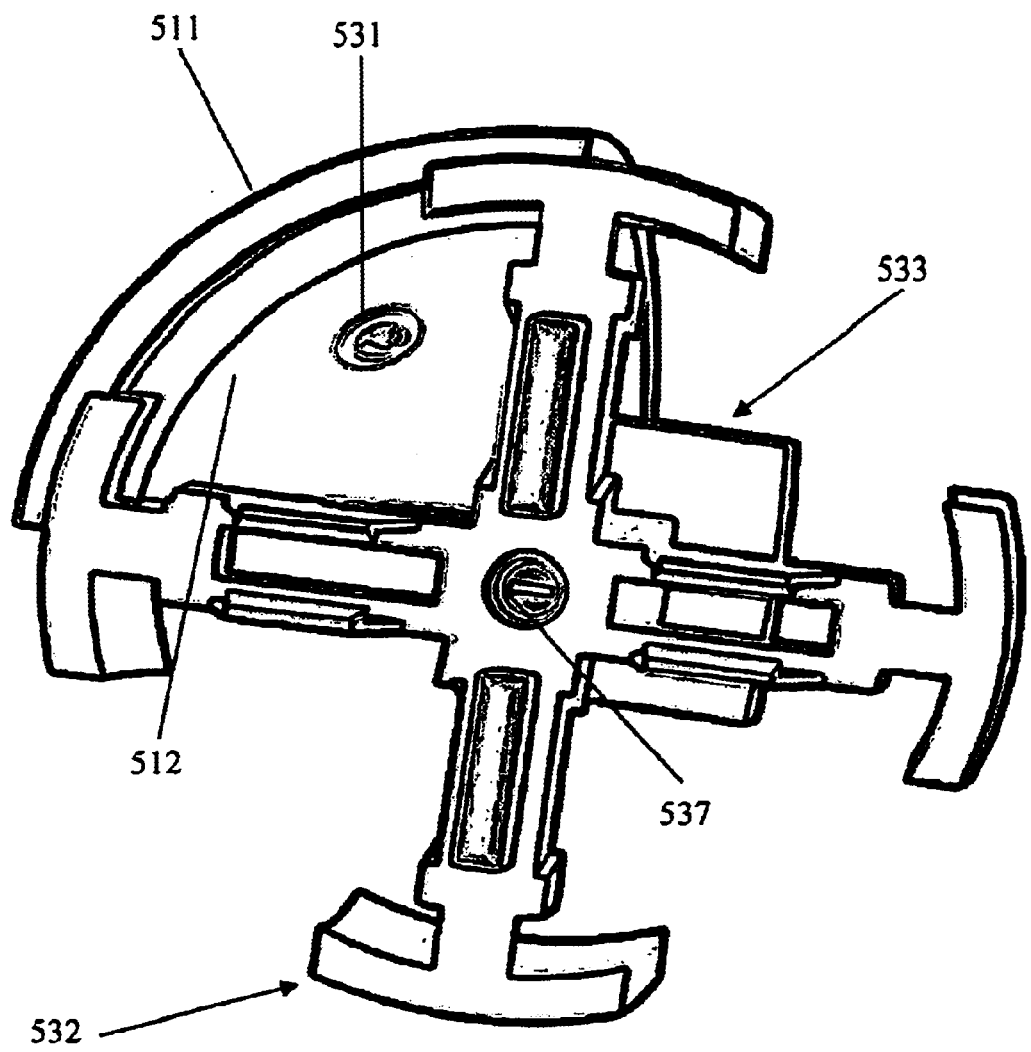
Figure 54A:
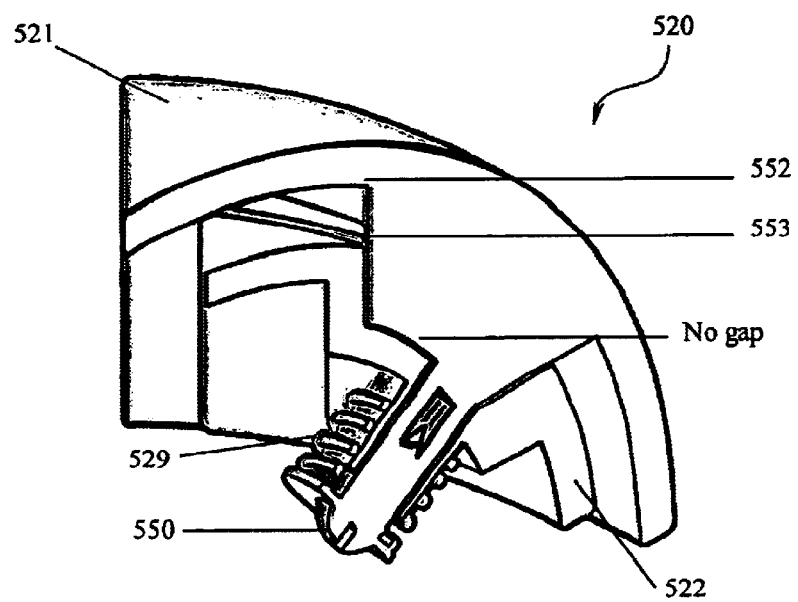
Figure 54B:
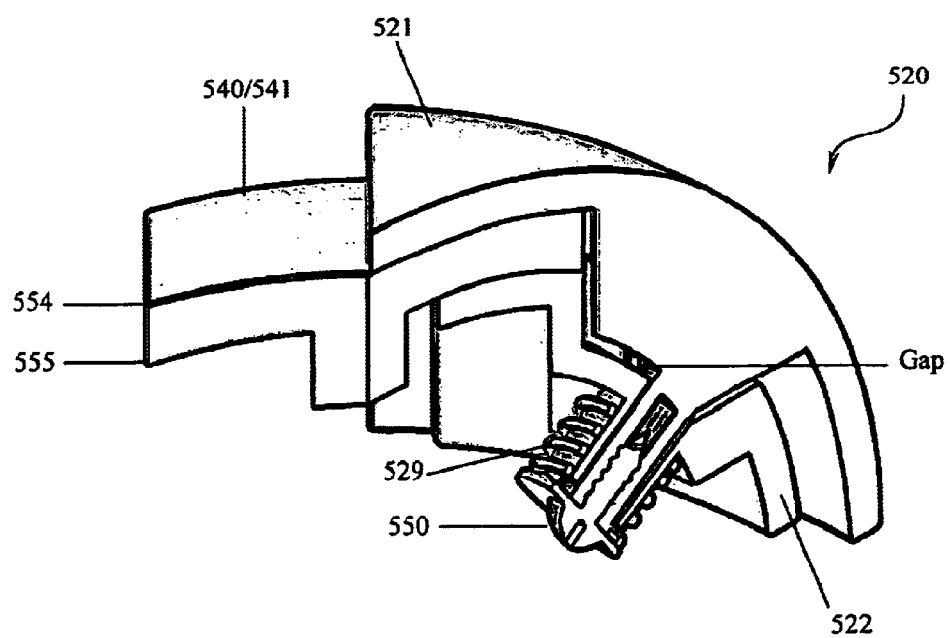
Figure 55A:
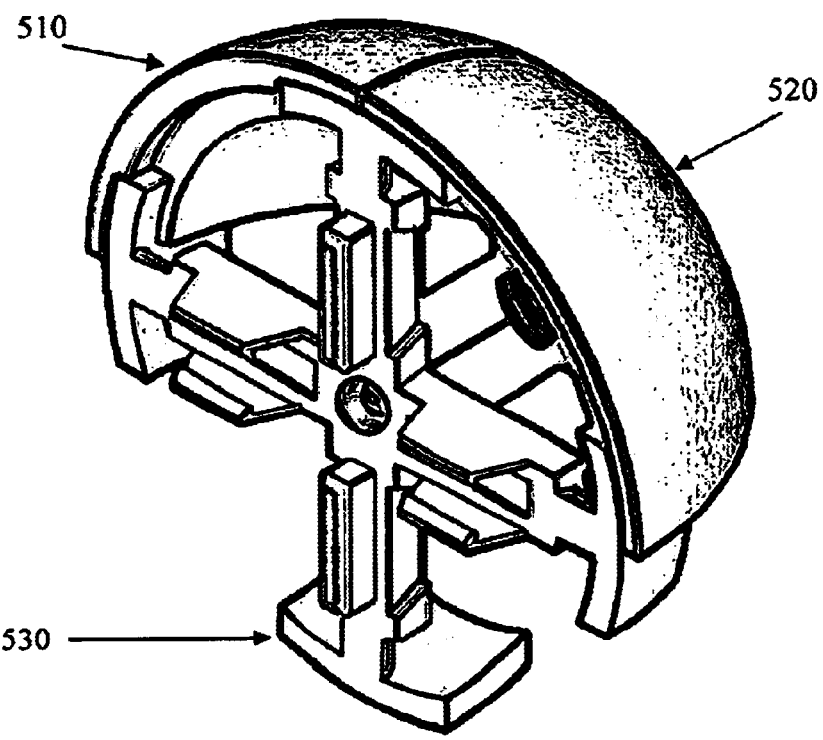
Figure 55B:
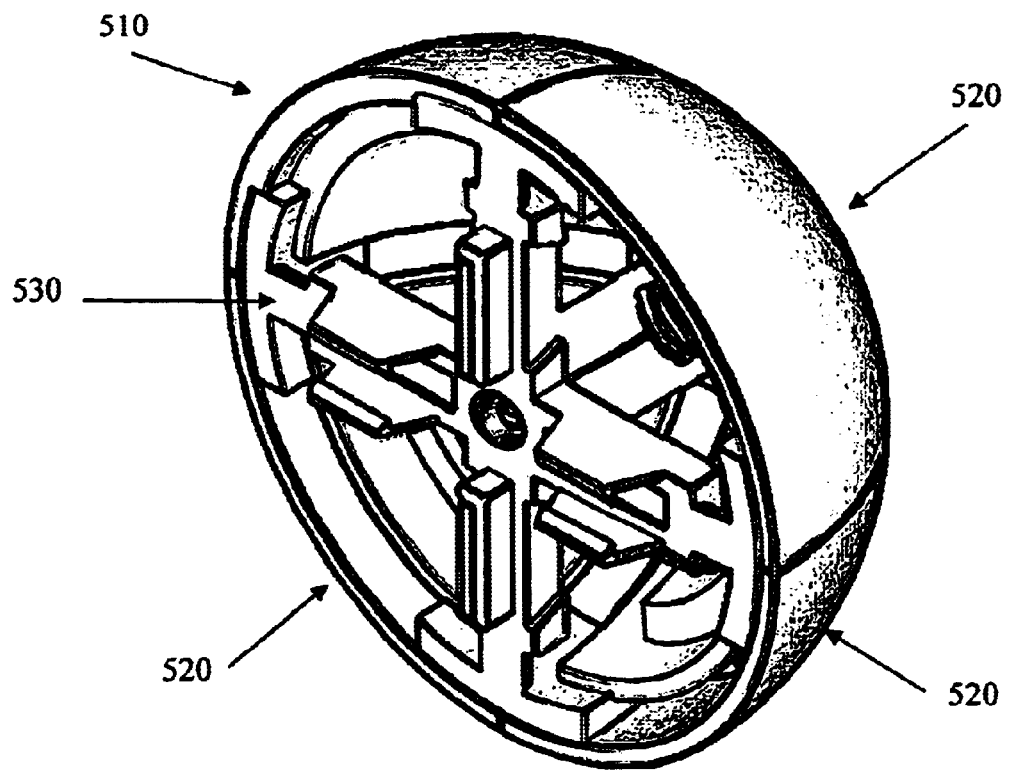

FIG. 30 is an exploded isometric view of an alternative embodiment of the present invention seen from south-easterly point;

FIGS. 31a and 31b illustrates the primary external segment of the puzzle of FIG. 30;

FIGS. 32a and 32b illustrate one of the secondary external segments of the puzzle of FIG. 30;

FIGS. 33a to 33j illustrate one part of the core of the puzzle of FIG. 30 and various associated components;

FIGS. 34a to 34e illustrate a second part of the core of the puzzle of FIG. 30 and various associated components;

FIGS. 35a to 35d illustrate various stages of assembling the puzzle of FIG. 30;

FIG. 36 shows the puzzle core of FIG. 30 in two halves before clipping;

FIGS. 37a and 37b are cut away views of the puzzle of FIG. 30;

FIGS. 38a and 38b are further cut away views of the puzzle of FIG. 30;

FIG. 39a and 39b are yet further cut away views of the puzzle of FIG. 30;

FIG. 40 is an isometric view of a 32-segmented sphere with the earth map applied on its surface;

FIG. 41 is a partially exploded front view of some elements of the 32-segmented sphere of FIG. 40;

FIGS. 42a and 42b illustrates the primary external element in the 32-segmented sphere of FIG. 40;

FIGS. 43a and 43b illustrates the secondary external elements in the 32-segmented sphere of FIG. 40;

FIGS. 44a and 44b illustrate the outermost external elements in the 32-segmented sphere of FIG. 40;

FIGS. 45a to 45d shows various stages of assembling the 32-segmented-sphere of FIG. 40;

FIGS. 46a to 46c shows the 32-segmented sphere of FIG. 40 with a symmetrical pattern applied on its surface;

FIGS. 47a to 47c show isometric views of the outer primary shell of a puzzle;

FIGS. 48a to 48c show isometric views of the inner primary shell of the puzzle of FIGS. 47 to 55;

FIGS. 49a to 49c show isometric views of an outer secondary shell of the puzzle of FIGS. 47 to 55;

FIGS. 50a to 50c show isometric views of an inner secondary shell of the puzzle of FIGS. 47 to 55;

FIGS. 51a to 51d show front, back, side and south-east views of the construction of the core of the puzzle of FIGS. 47 to 55;

FIGS. 52a and 52b show south-east isometric views of the further assembly of the core of the puzzle of FIGS. 47 to 55;

FIG. 53 shows an isometric view of core of the puzzle shown in FIGS. 47 to 55 with the primary external segment fitted;

FIGS. 54a and 54b shows in isometric view the partial assembly of the secondary external segments of the puzzle of FIGS. 47 to 55; and FIG. 55 shows in isometric view the further assembly of the secondary external segments of the puzzle of FIGS. 47 to 55.

FIGS. 1–11 of the drawings shows a 3D spherical rotary puzzle 1 in accordance with the present invention. The puzzle 1 comprises a primary external segment 10 and seven secondary external segments 20, nine joining plates and a central core 40.

Figure 3A:
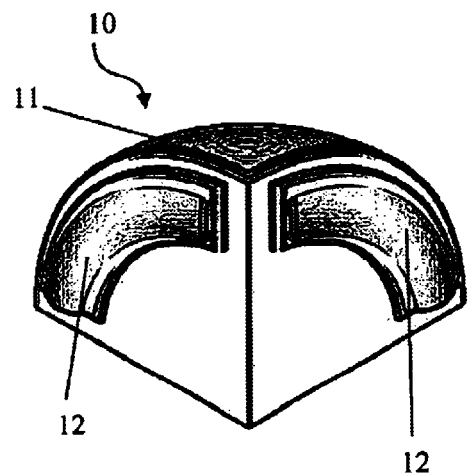
Figure 3B:
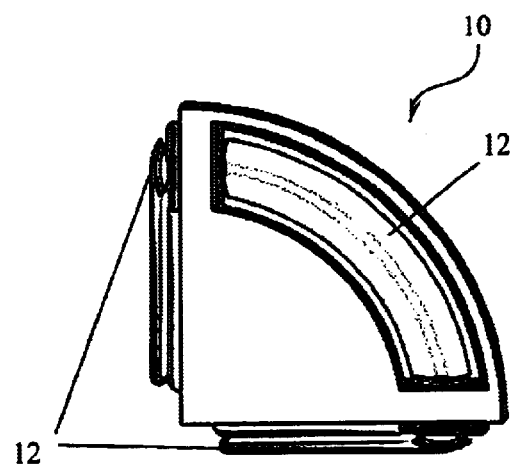

The primary external segment 10 is part spherical on the external surface 11 and has a protruding edge 12 on each of its three straight sides as seen in FIGS. 3a and 3b.

Figure 4A:
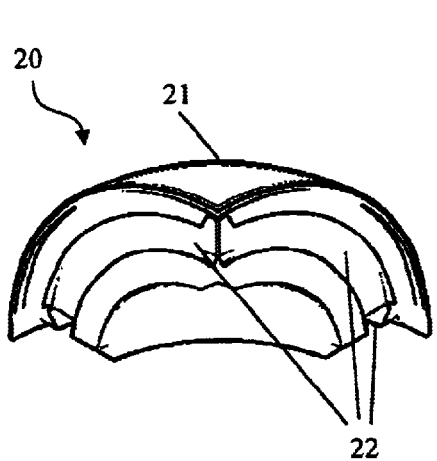
Figure 4B:
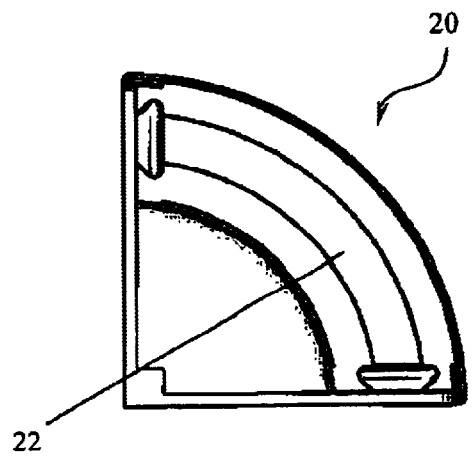
Figure 5A:
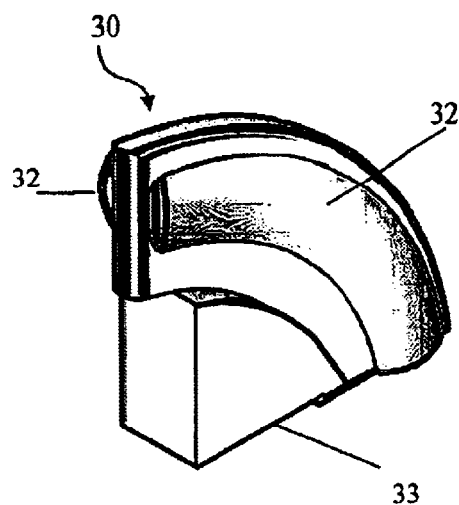
Figure 5B:
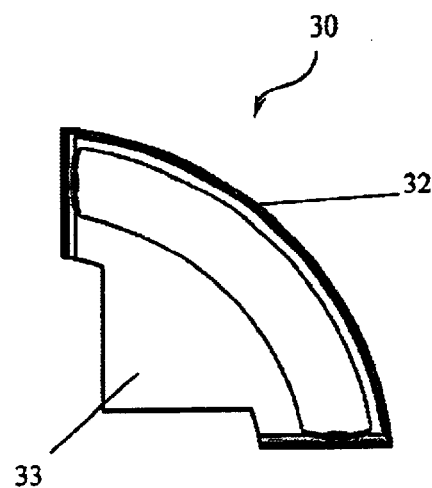
Figure 5C:
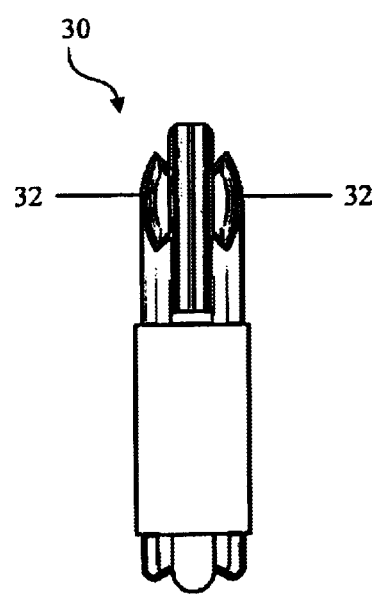
Figure 5D:
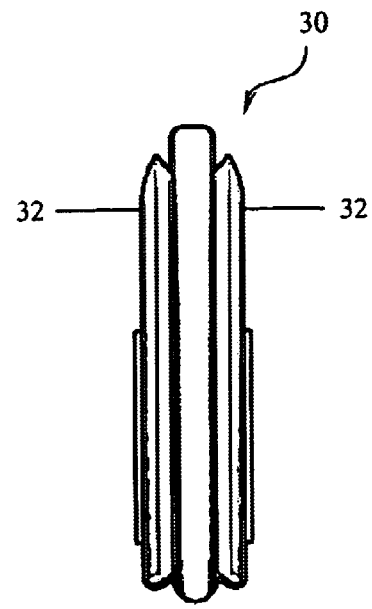
Figure 6A:
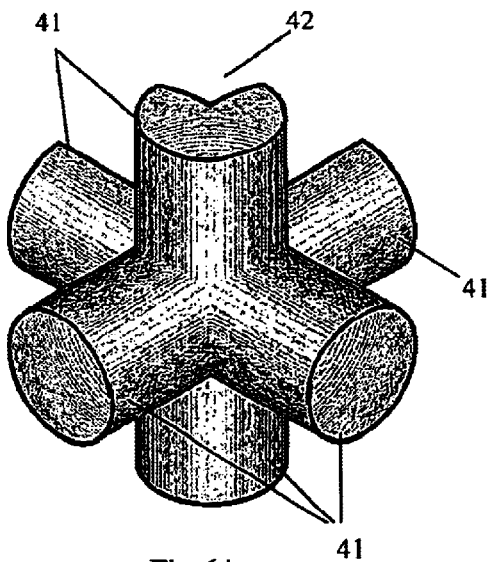
Figure 6B:
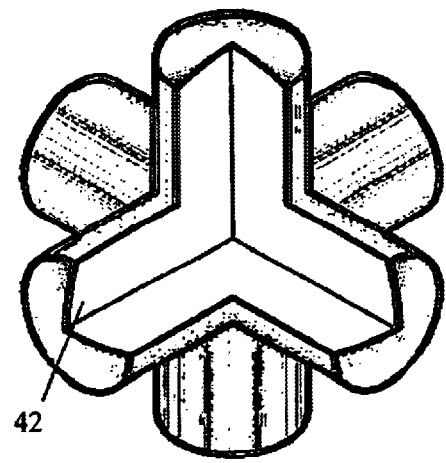
Figure 6C:
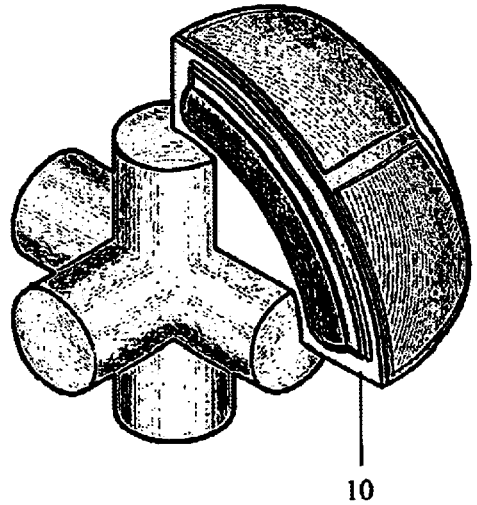
Figure 6D:
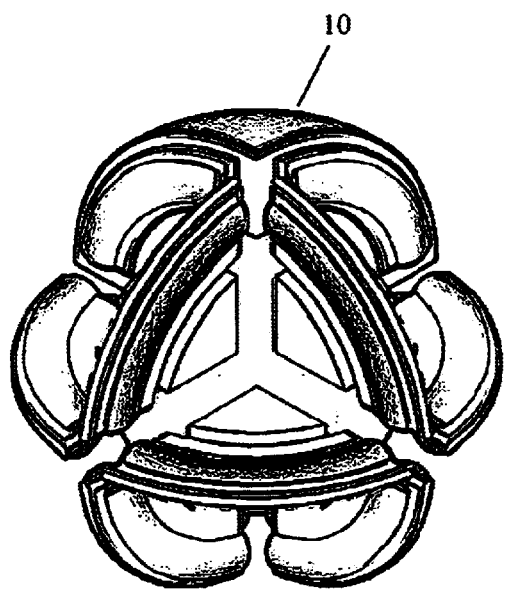
Figure 7A:
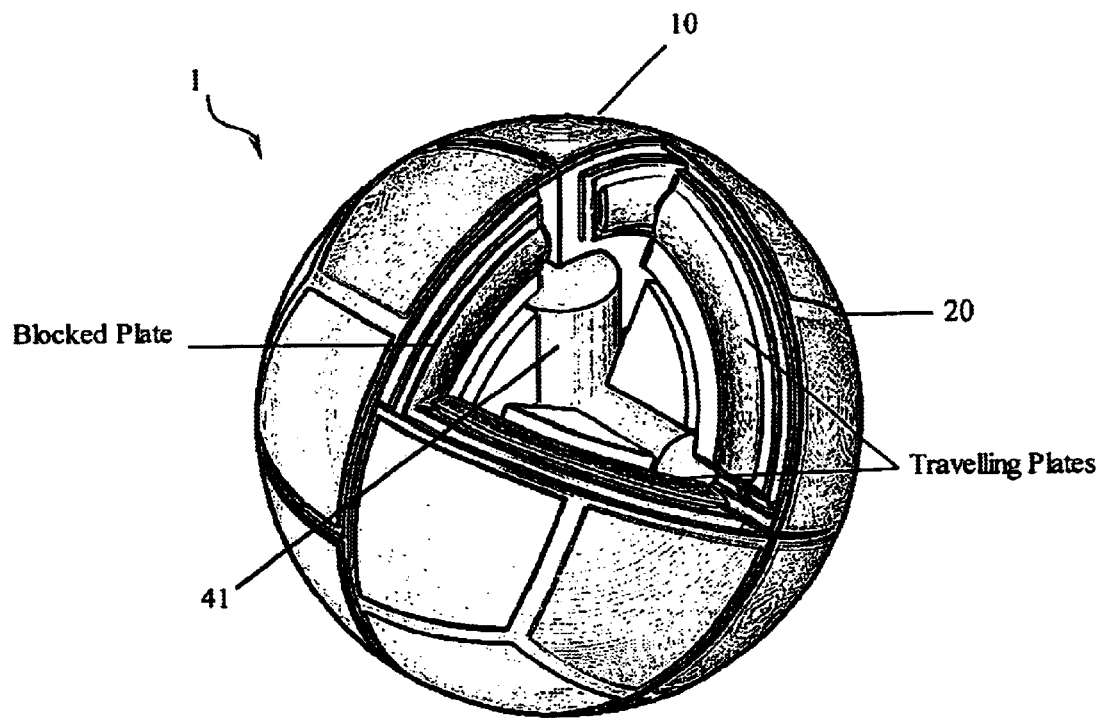
Figure 7B:
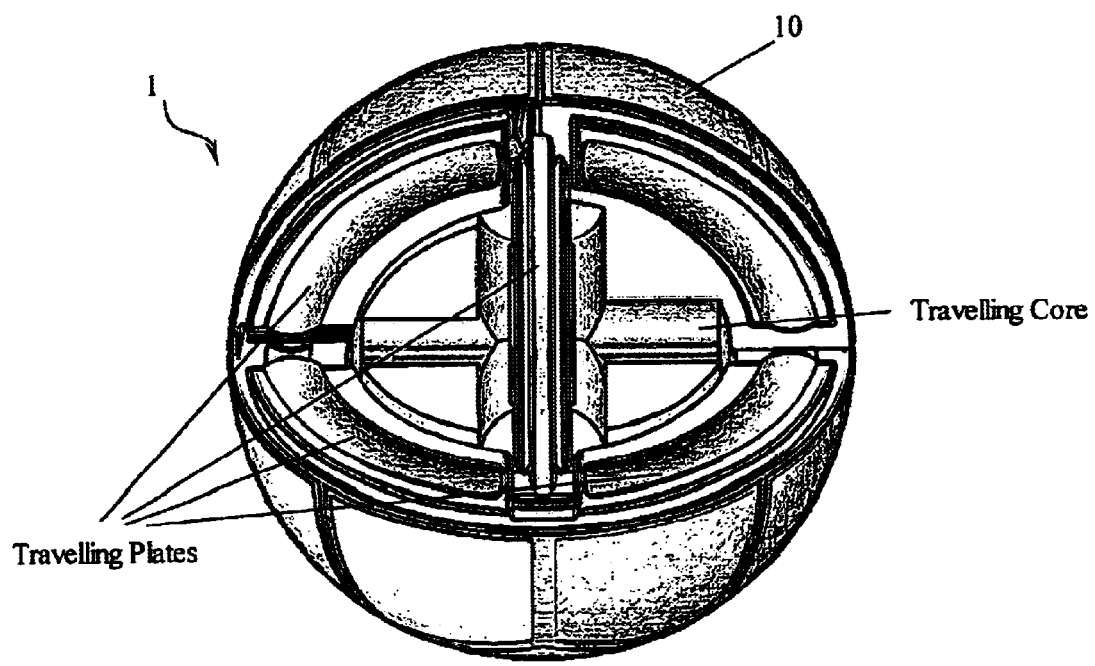
Figure 8A:
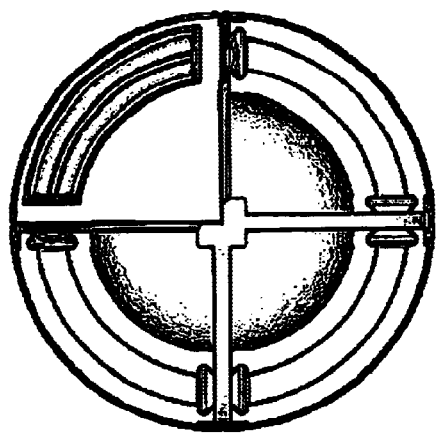
Figure 8B:
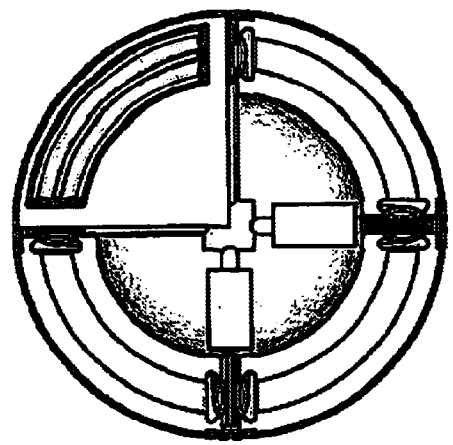
Figure 8C:
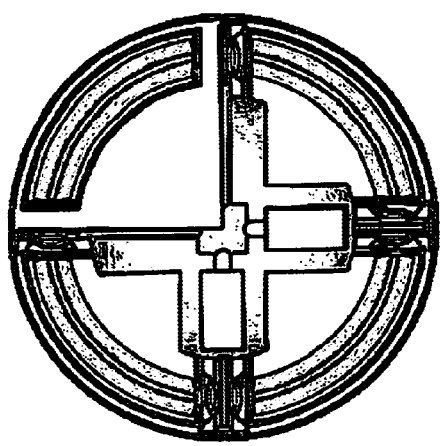
Figure 8D:
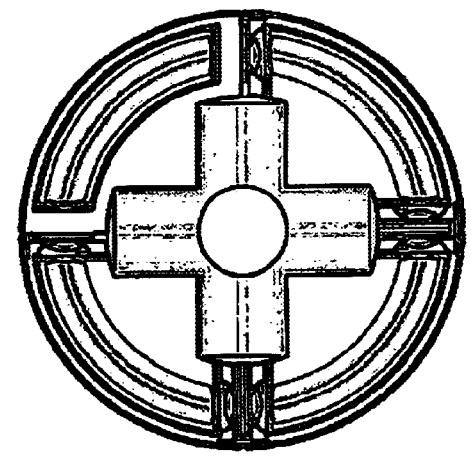
Figure 8E:
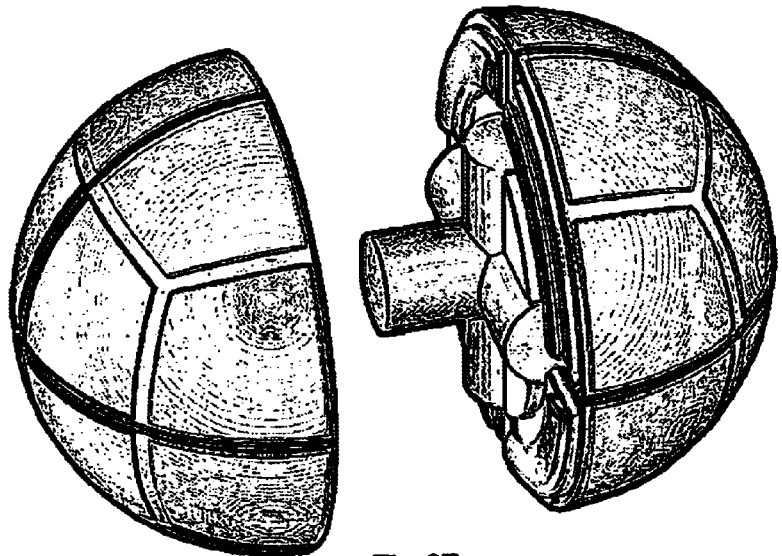
Figure 9A:
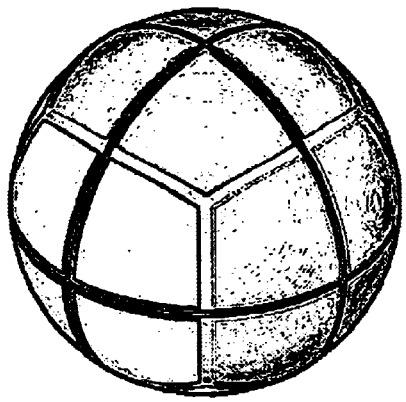
Figure 9B:
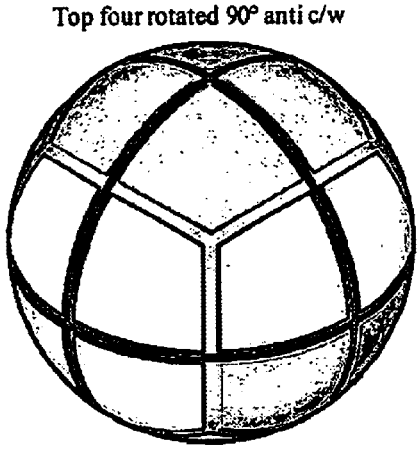
Figure 9C:
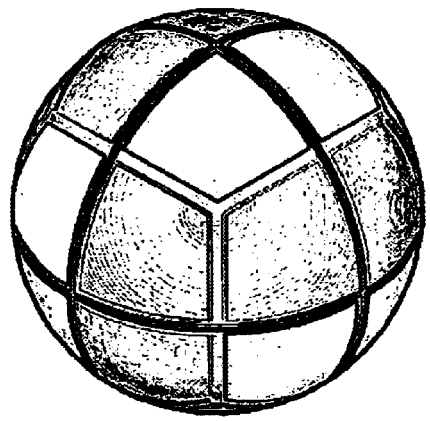
Figure 9D:
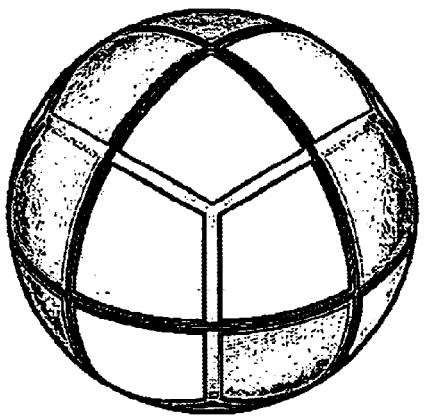
Figure 9E:
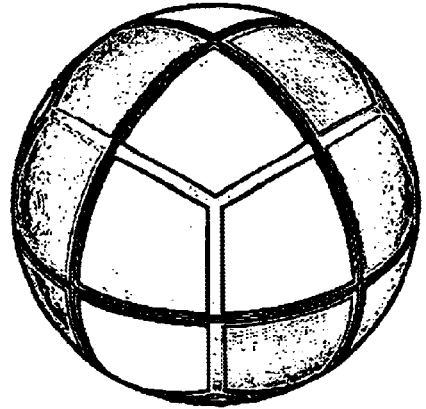

The seven secondary external segments 20 are externally similar to the primary external segment 10 but different internally as seen in FIGS. 4a and 4b. They are again part spherical on the external surface 21 but are partially hollow and have a groove 22 on each of their three sides.

The protruding edges 12 on the primary external segment 10 complement and slidably mate with the grooves 22 on the secondary external segments 20.

Figure 10A:
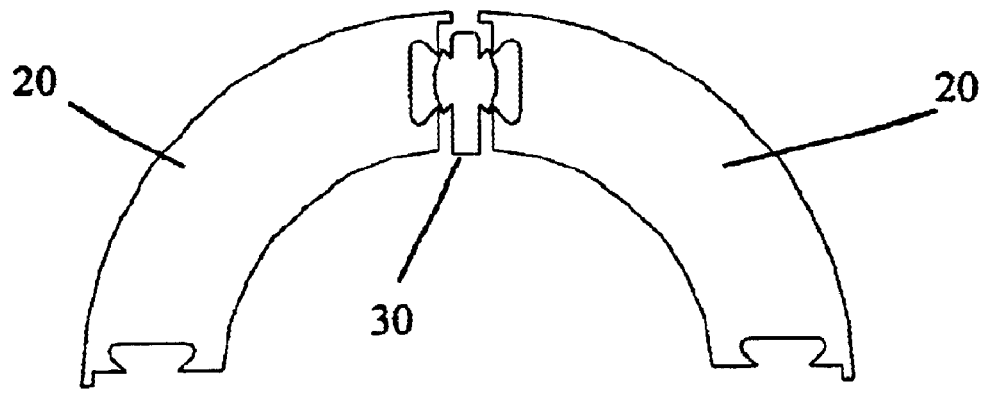
Figure 10B:
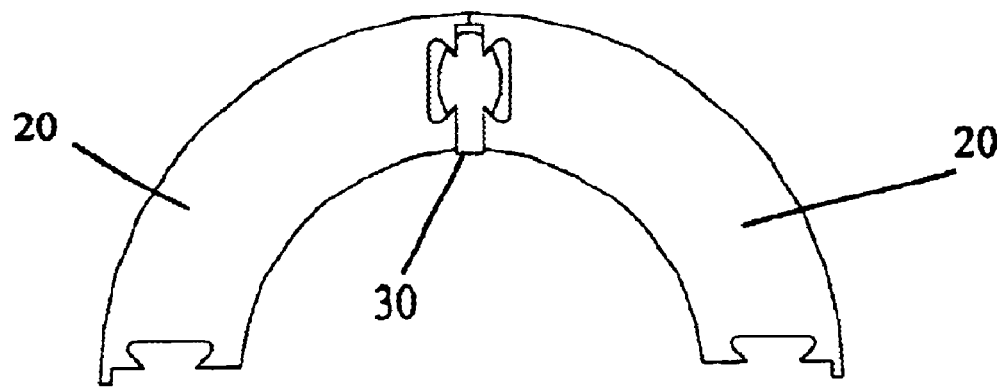

The nine joining plates 30 have edges 32 on both sides which are of precisely the same dimensions as those of the primary external segment 10, shown in FIGS. 5a to 5d. These also complement and slidably mate with the grooves 22 on the secondary external segments 20. They clip into place as shown in FIG. 10.

In order to prevent possible jamming of the parts due to free movements or sliding of the plates and to control the behaviour of all the parts when in rotation, a core 40 is provided, shown in FIG. 6. The core has six cylindrical broad points 41, positioned at 90° angles from each other as seen in FIG. 6a. The core also has a groove 42 cut at straight angles along the x-y-z axes; centre point to centre point, designed to receive the straight edges of element 10 as shown in FIG. 6c. The broad cylindrical points allow the extensions 33 of the joining plates to be fitted in contact with the core 40. This secures all the plates in their home position and blocks the movement of any three plates opposing the direction of rotation when the primary external segment 10 is held, or force any three plates in the direction of rotation to move when primary external segment 10 is rotated. This will become evident in the following examples.

The primary and secondary external segments 10 and 20 clip onto adjacent joining plates 30 and interact with the core 40. When all parts have been assembled a complete sphere is produced.

Thereafter four segments can be rotated against the other four as follows:

Top four against bottom four and vice versa
Right four against left four and vice versa
Front four against back four and vice versa Home position is achieved every time the parts are rotated in 90° increments irrespective of the direction e.g. 90, 180, 270 and 360 without necessarily solving the puzzle pattern.

For those who wish a more challenging puzzle, the puzzle can be reconfigured in a number of ways which make the solution more difficult without changing the physical make up of the puzzle.

Figure 11:
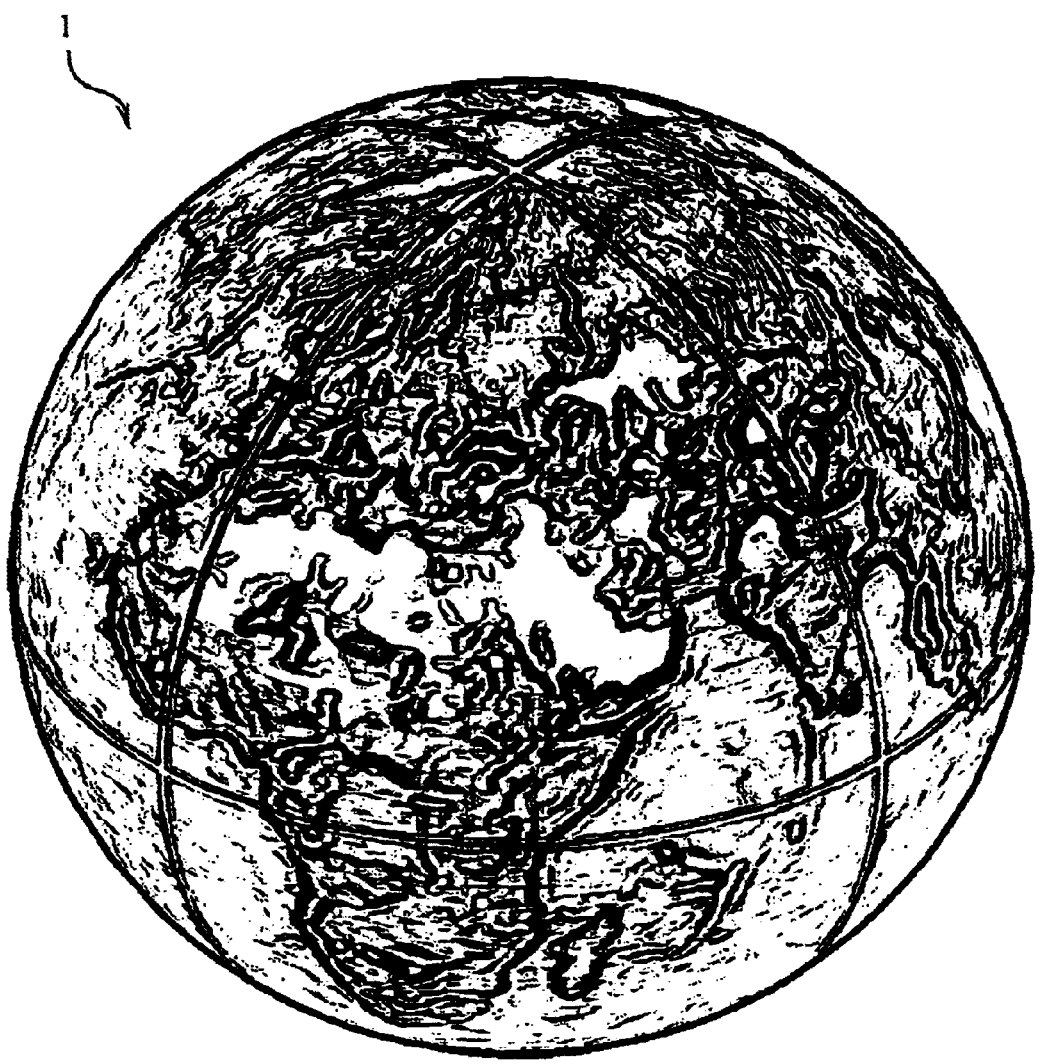
Figure 12A:
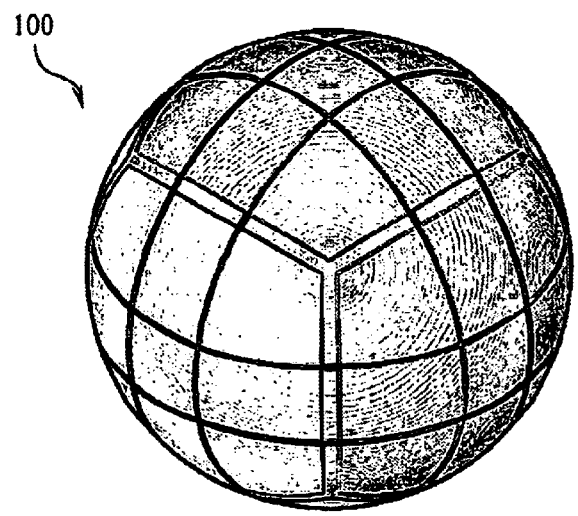
Figure 12B:
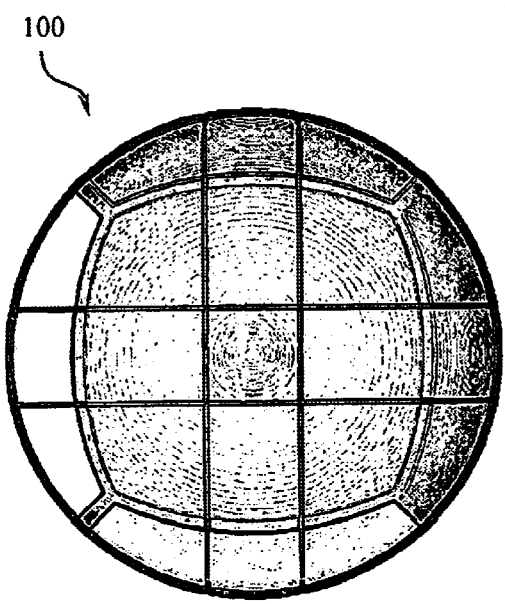
Figure 12C:
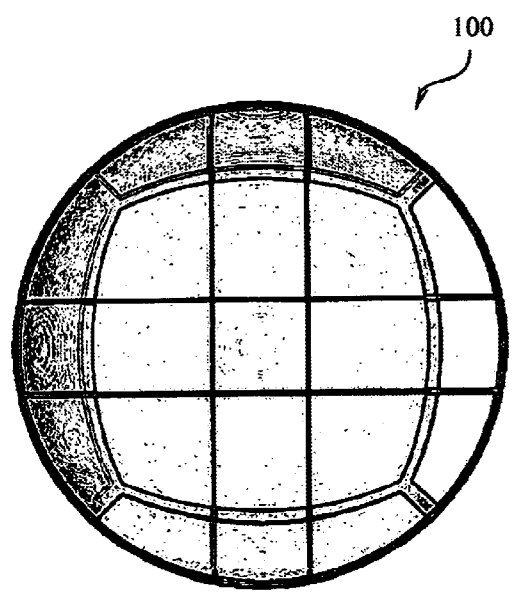
Figure 13:
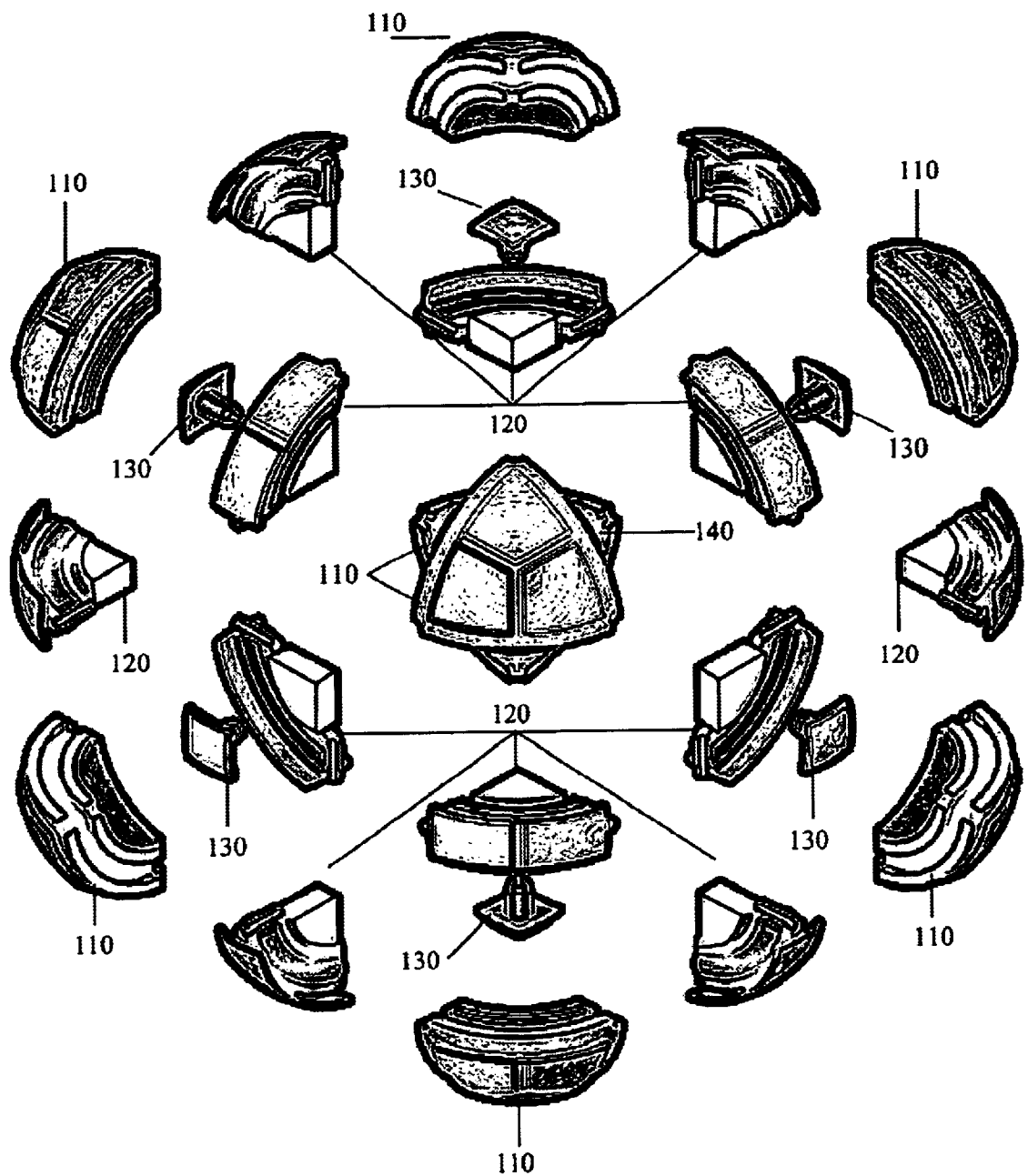

One such change is to apply a non-symmetrical design to the segments. For example, FIG. 11 shows a globe map which makes the puzzle rather more difficult by requiring, in this case, a knowledge of geography as well as logic.

Figure 1A:
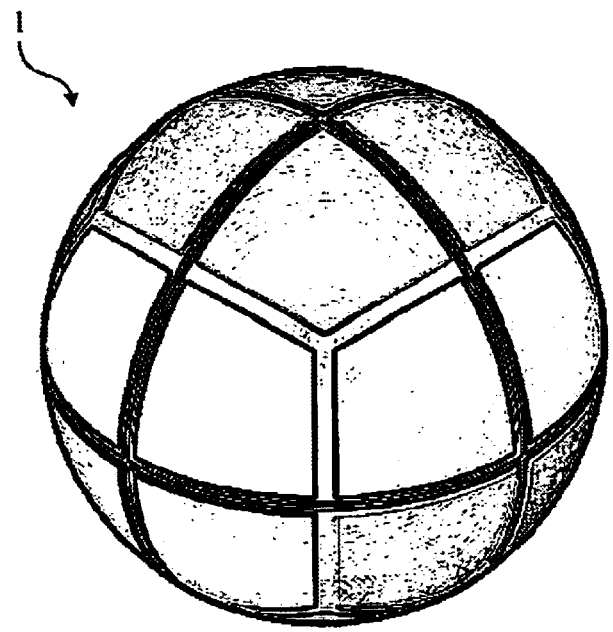
Figure 1B:
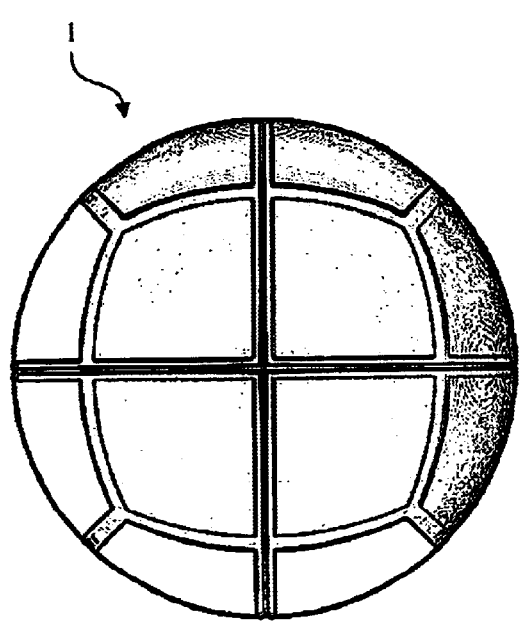
Figure 1C:
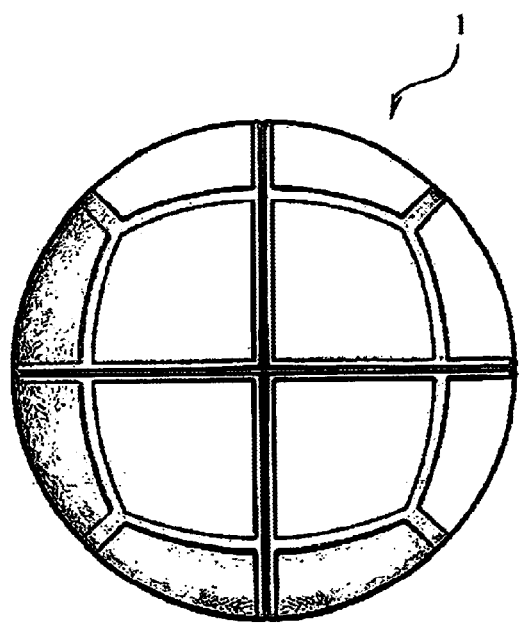
Figure 2:
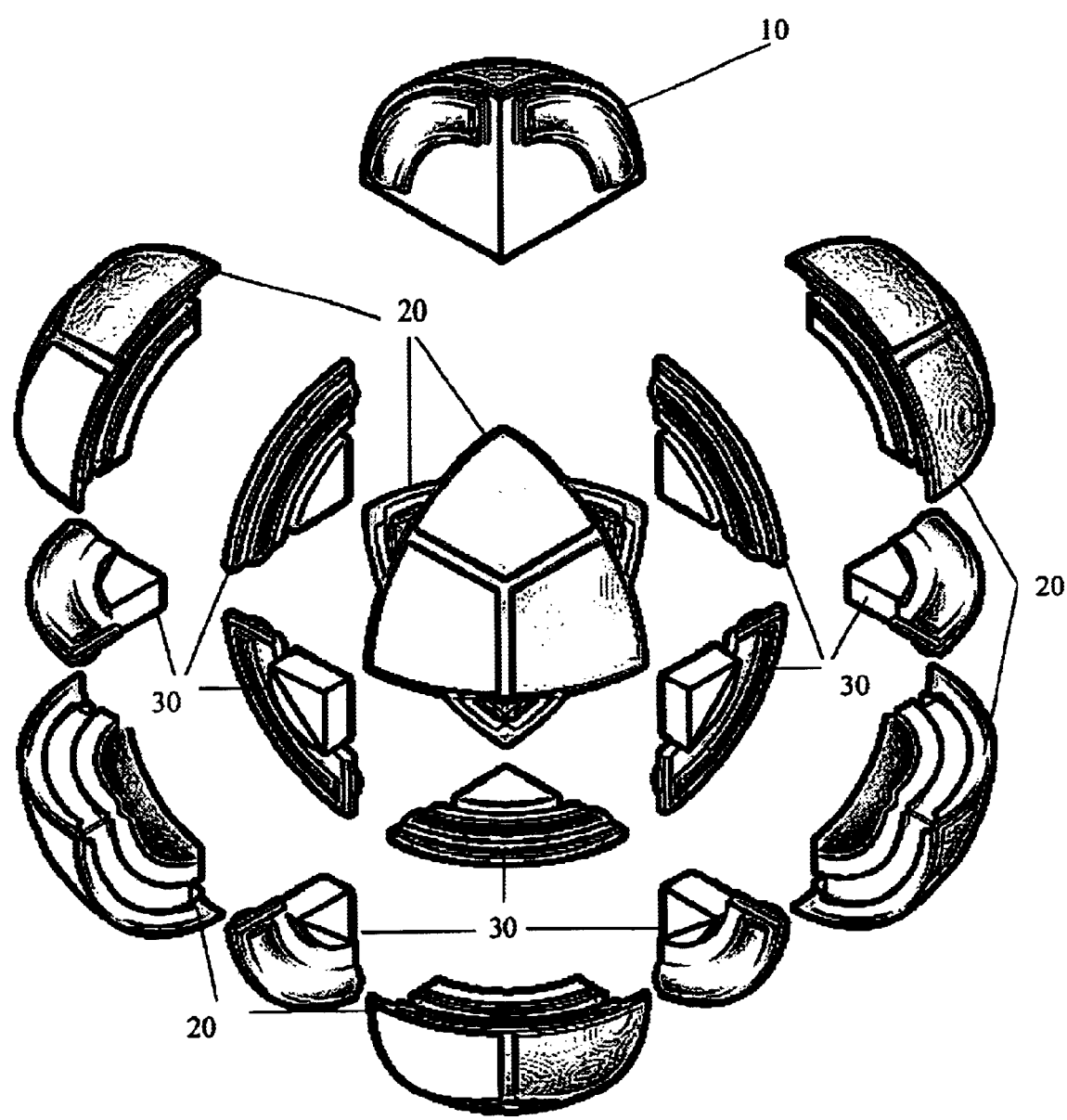

In the basic version of the puzzle the segments have three different coloured sections as can be seen in FIG. 1. In the original position of the puzzle the segments are arranged so that the colours of the sections on adjacent segments match. The objective of the puzzle is to restore the colour pattern of the eight external segments to the original position after scrambling them.

It will also be clear to one skilled in the art that this puzzle could be adapted, by the addition of means to urge external segments to move relative to each other, analogously to the movement of the external segments of the puzzle, to form a way of moving external segments of a 3D object relative to each other. For instance, the junction between the protruding edges and grooves could have drivable cogs on one surface and a plurality of teeth on the other, thereby enabling automatic motor to drive the movement of external segments relative to each other. This would allow a 3D object, such as a satellite to move objects such as antenna, dishes, communication means, solar panels etc. on its surface relative to each other. In particular, by considering Newton's Laws, it will be clear that if the moment of each segment of the object were balanced, the individual external segments of e.g. a satellite in orbit, could be moved relative to each other without altering the orientation of the core of the device, making it much easier to orient antenna etc. relative to each other without requiring complex manoeuvring to maintain orientation.

If it were possible to provide a way of moving a greater number of external plates of a sphere or other 3D object relative to each other, this could be used both to create a more difficult puzzle and more flexible apparatus for moving external parts of objects relative to each other.

In another embodiment of the present invention, a puzzle with twenty-six visible external segments can be provided by altering the joining plates so that they form part of the outer surface. They could then form part of the puzzle, for example by requiring colour matching with the segments. This adds a considerable number of possibilities to the solution as the plates exchange positions every time the puzzle is rotated.

This can be seen in the example illustrated in FIGS. 12 to 19. The puzzle 100 comprises eight external segments 110, each of which is part spherical; twelve joining plates 120; six core tops 130 and a core element 140.

Individual external segments 110, joining plates 120 and core tops 130 differ only in terms of the colours applied to the surfaces of each. As in the previous embodiment, the puzzle forms the shape of a sphere when it is assembled.

The puzzle is rotated in layers being outer layers and centre layers; each of the six outer layers consists of four external segments 110, four joining plates 120 and one core top 130; each of the three centre layers consists of four joining plates 120 and four core tops 130. The outer layers are right, left, front, back, top and bottom layer. The centre layers are X plane, Y plane and Z plane layer.

By rotation all external segments 110 will be able to interchange with each other, likewise all joining plates 120 will be able to interchange with each other; core tops 130 will not interchange with each other.

Figure 14A:
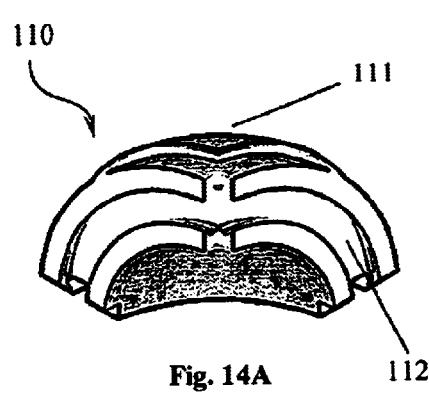
Figure 14B:
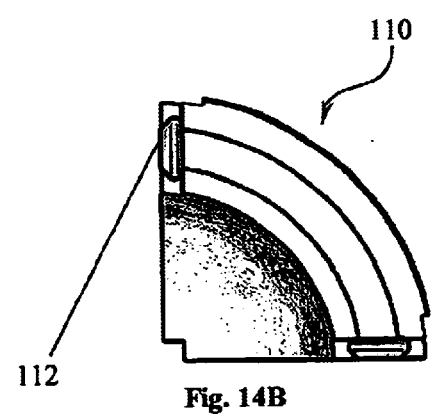
Figure 15A:
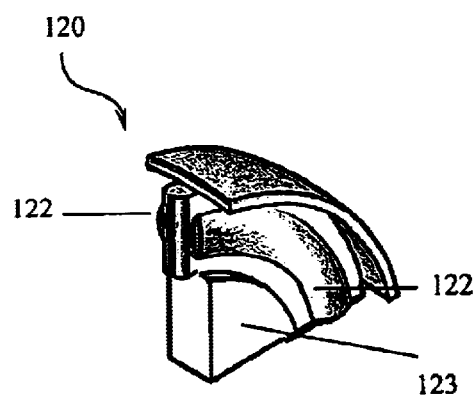
Figure 15B:
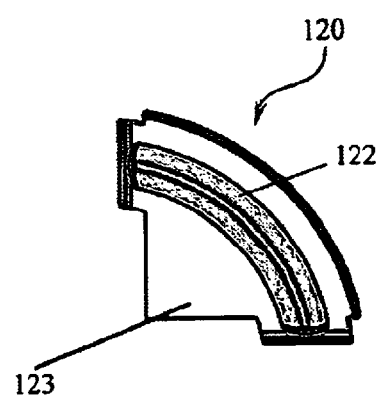
Figure 15C:
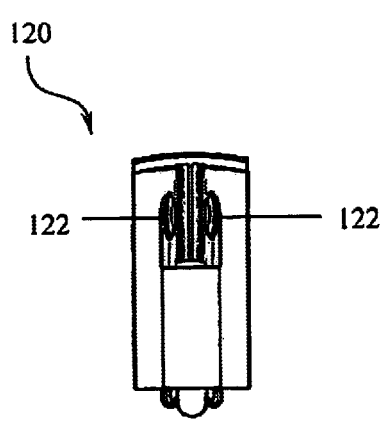
Figure 15D:
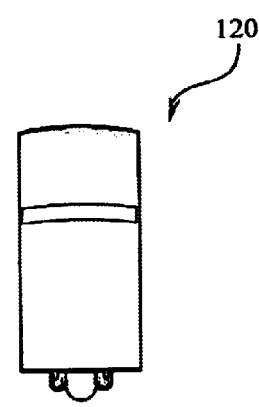
Figure 16A:
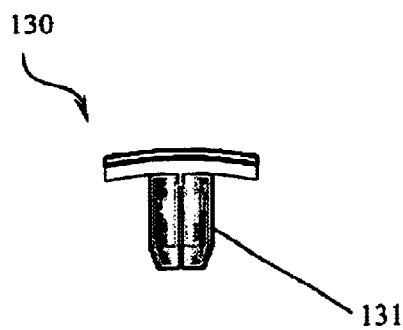
Figure 16B:
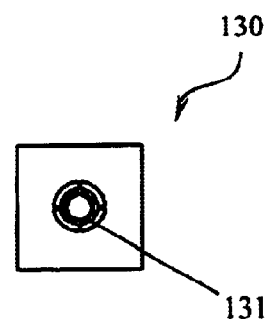
Figure 17A:
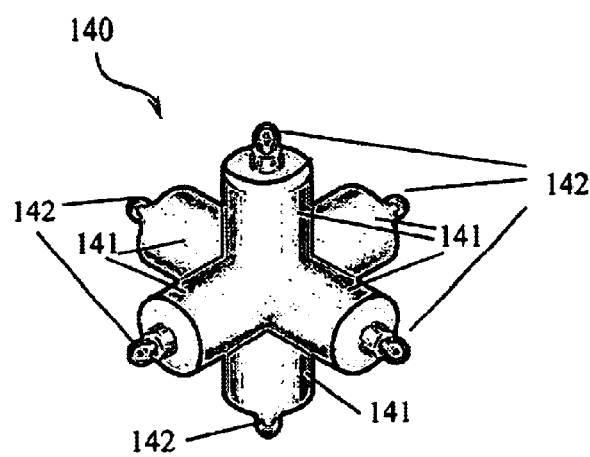
Figure 17B:
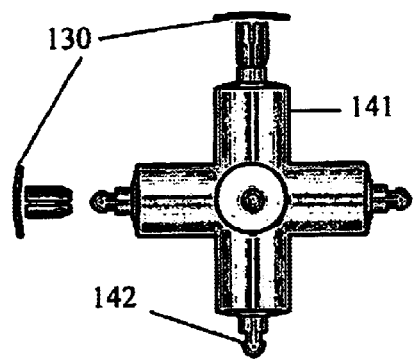
Figure 17C:
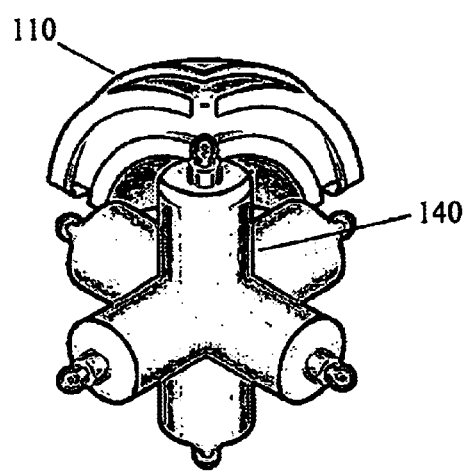
Figure 17D:
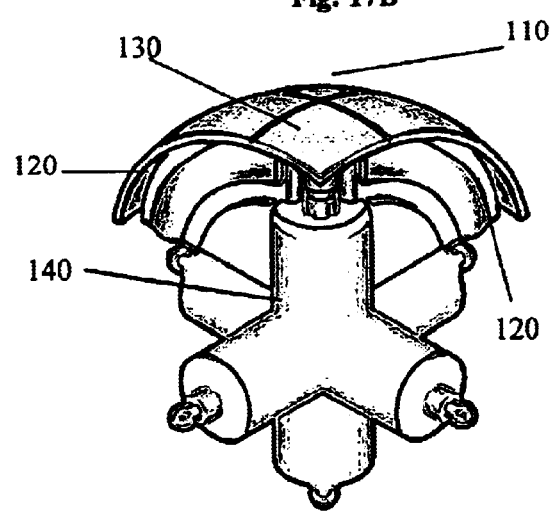
Figure 18A:
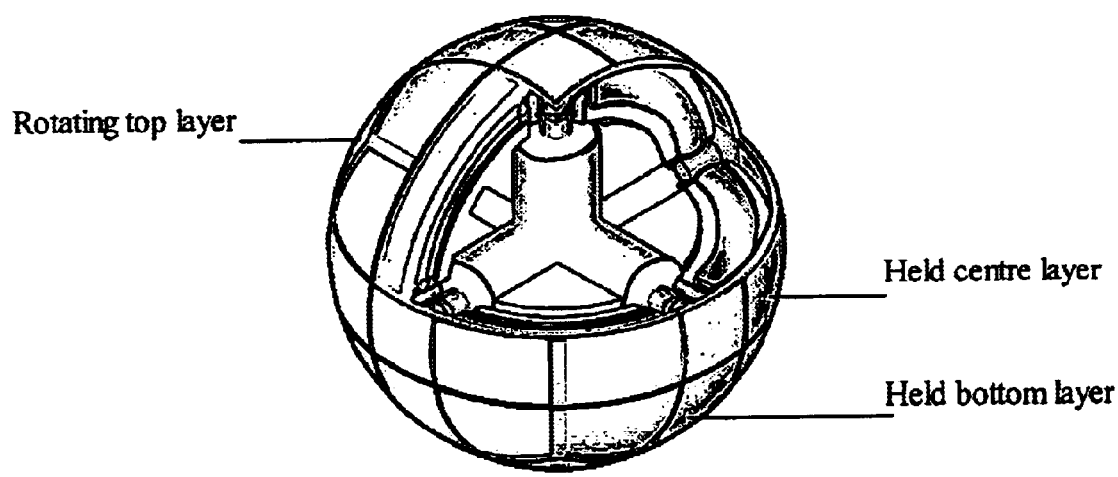
Figure 18B:
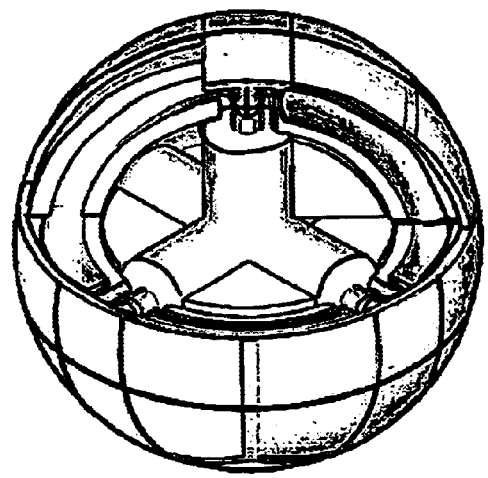
Figure 18C:
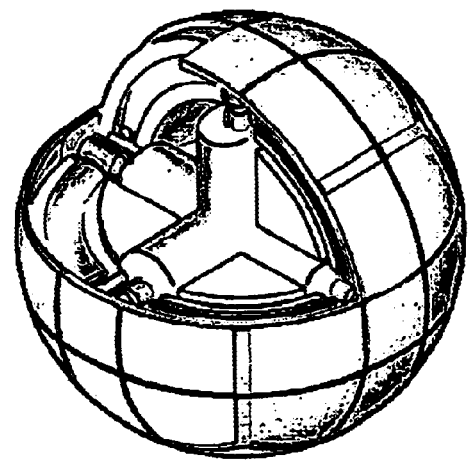

Each external element 110 has a part spherical outer surface 111, a hollow centre and a groove 112 on each of its three sides as shown in FIGS. 14a and 14b.

Each joining plates 120 has a protruding edge 122 as shown in FIGS. 15a to 15d. The protruding edges 122 are designed to slidably clip into and cooperate with grooves 112.

Once all the twelve joining plates 120 are clipped to the eight external segments 110, a sphere will be formed missing six squares where core tops 130 will be placed.

In order to prevent possible jamming of the parts due to free movements or sliding of the plates, a core 140 is provided. The core 140 has six cylindrical broad points 141, positioned at 90° angles to each other as seen in FIG. 17. At the end of each broad point 140 there is a cylindrical member 142 which cooperates with a clip 131 from a core top 130.

Figure 21A:
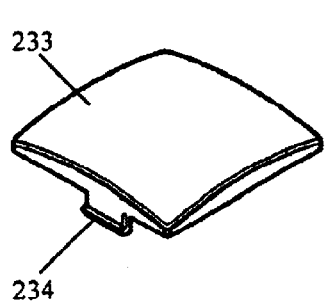
Figure 21B:
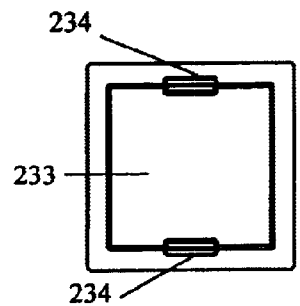
Figure 21C:
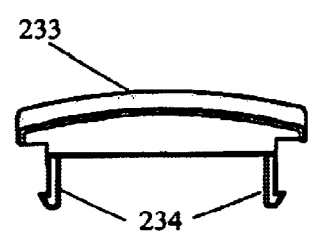
Figure 22A:
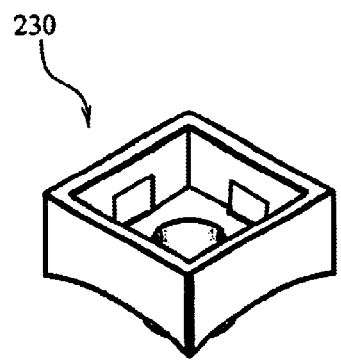
Figure 22B:
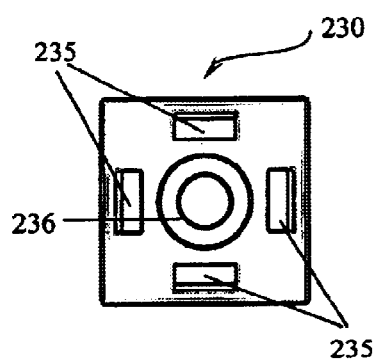
Figure 22C:
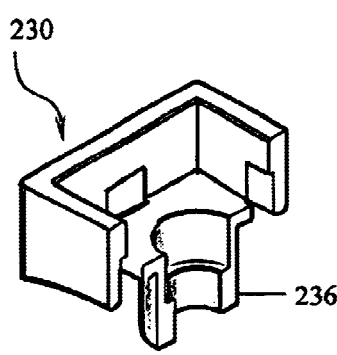
Figure 23A:
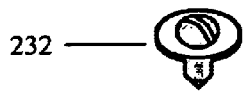
FIGS. 23a and 23b are isometric views of accessories for core tops in the puzzle of FIG. 20.
Figure 23B:
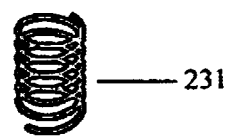
Figure 24A:
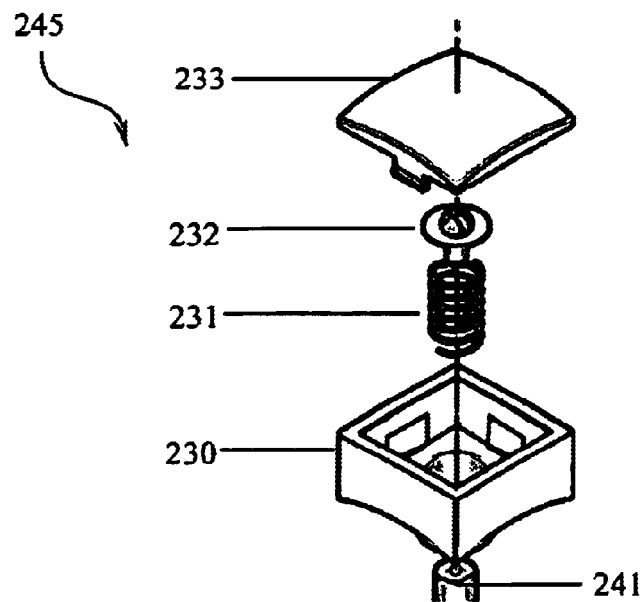
FIGS. 24a and 24b illustrates the relationship of parts of the core tops in the puzzle of FIG. 20.
Figure 24B:
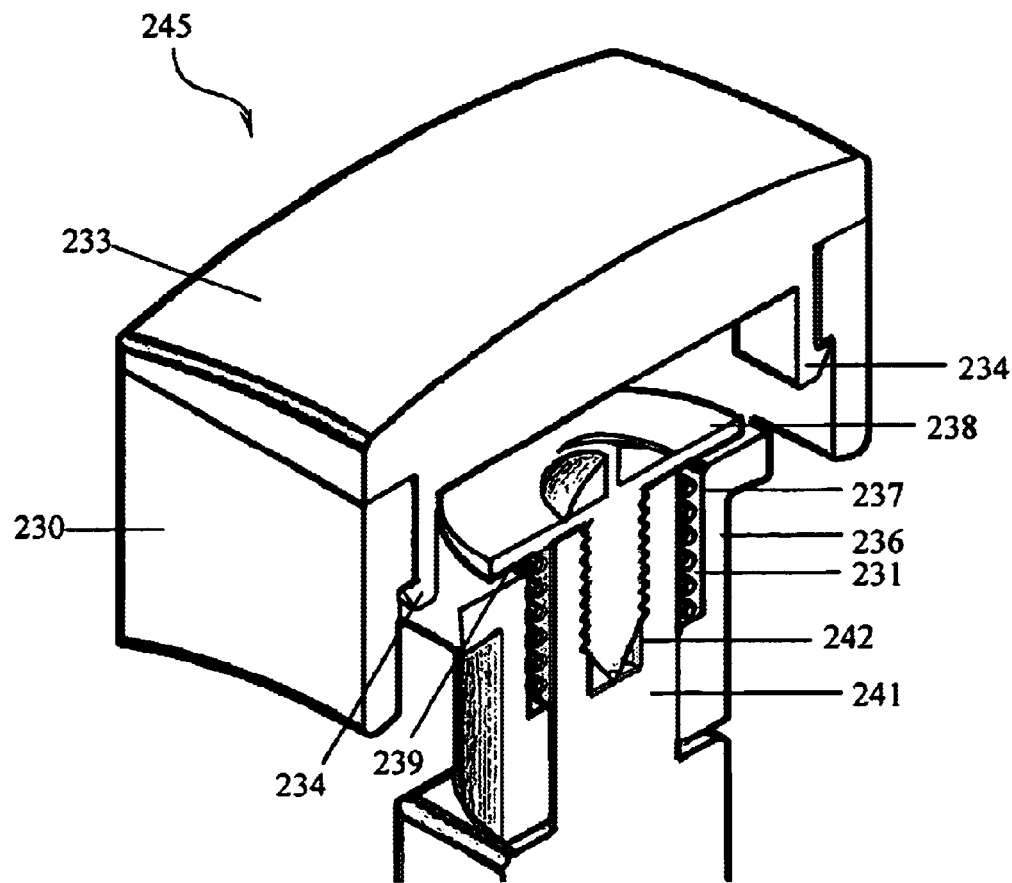

The broad cylindrical points of the core allow the extensions 123 of the joining plates 120 to fit between The core tops 230 are shown in detail in FIGS. 21 to 23. Core top cap 233 which is part spherical in shape on the outside, has a straight surface on the inside with two hooks 234. Core top cap 233 mates irreversibly with corresponding clips 235 in core top 230.

Along with spring 231 and screw 232, the core top 230 and core top cap 233 together form a core top assembly 245 which forms a complete element that will fit in the cylindrical ends of core 240. The purpose of the spring is to create a slight inward spring tension in order to keep all the elements hugged together and insure smooth rotational action, this is achieved as follows:

The tube like end 236 of element of core top 230 fits in the cylindrical end 241 of element 240, the spring 231 is inserted in the area 237, the screw 232 fits in the hole 242 of core 240 forcing the spring 231 to compress, since the cylindrical end of core 240 is slightly taller than the tube 236 of core top 230 the spring 231 will force core top 230 inwards by the difference in size of the cylindrical end and the tube. The flat surface 238 of the screw is larger in diameter than the tube in core top 230 which will insure that core top 230 will not move outward more than the gap 239, core top cover 233 can now be pushed into the corresponding recesses 235 in core top 230 and the hooks 234 of the core top cover 233 will clip on the rim of the core top.

Joining plates 220 have protruding edges 222 which have a part spherical shape complementary to the internal surface of core tops 230 which therefore allows the individual axes of the core. This will secure all the plates in their home position as well as control all the involved parts as will become evident in the following example.

Figure 19A:
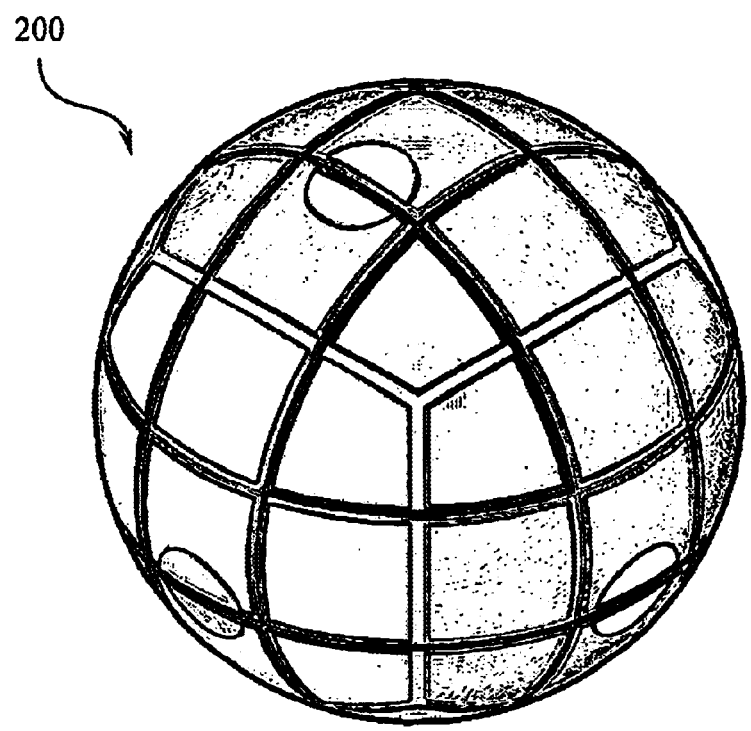
Figure 19B:
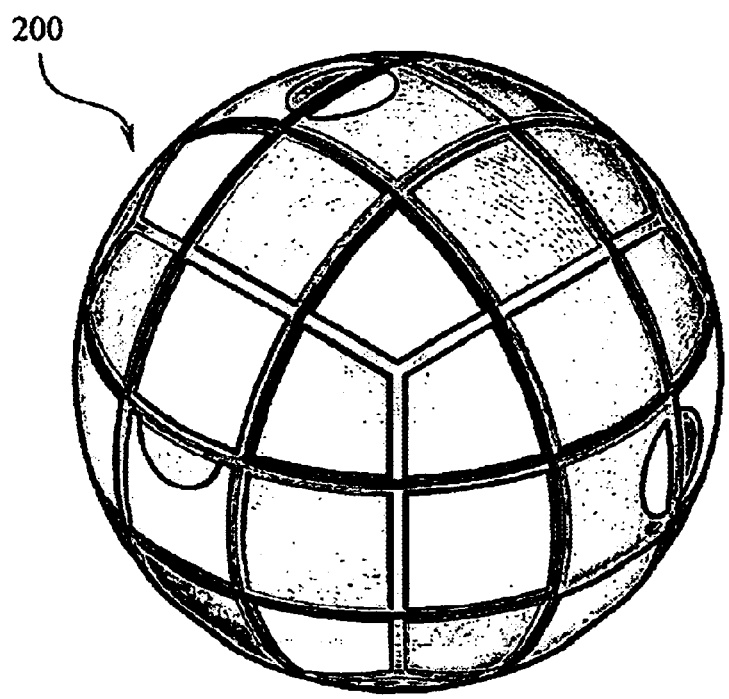

FIG. 19 shows a version of the twenty-six piece puzzle in which the provision of asymmetric markings on the core tops means that to solve the puzzle, core tops must be correctly orientated relative to joining plates. This increases the difficulty of the puzzle immensely.

When designing puzzles of this type, it is important to consider how they are to be manufactured. The prior art contains designs for puzzles which are impractical to manufacture, either because they require unrealistic tolerances or simply there exists no practical way to assemble them.

In a further embodiment, there is presented a variation of the twenty-six segment puzzle improved for the purposes of manufacture. Not only can it be readily assembled, it contains mechanisms to enable it to function smoothly and well using pieces with realistic tolerances for mass manufacture.

Analogously to the puzzle shown in FIGS. 12 to 19, this embodiment 200, shown in parts in FIGS. 20 to 29 comprises eight external segments 210, each of which is part spherical; twelve joining plates 220; six core tops 230; and a core element 240.

As before, the puzzle forms a sphere and individual outer and centre layers can rotate separately as before. protruding edges 222 to rotate under the core tops 230 when the puzzle is rotated.

Likewise, external segment 210 is also part spherical on the outside and has continuous protruding edges 212 on the inside as seen in FIGS. 26 a and b these edges are complementary in their spherical shape to both bottom shapes of core top 230 and joining plates 220 that will allow the protruding edges 212 to rotate under either. The protrusion 212 of the edges of external segments 210 will not reach those of joining plate 220 when the puzzle is assembled and the protrusion of both the joining plate 220 and the external segments 210 will not reach the outside of the tube in the core top 240 allowing all parts to rotate freely.

For assembly, as shown sequentially in FIGS. 28a–28g, five core tops 230 can be fitted against the ends of the core 240, the springs 231 inserted therethrough and the screws 232 inserted and tightened, compressing the spring and forcing the core cap 230 against the core 240.

Four joining plates 220 can now be slid in place followed by four external sections 210. Four further joining plates 220 are fitted in place. Followed by four further external sections 210 and the final four joining plates 220. The final core top assembly 235 is then assembled in situ.

If the segments are forced apart by hand after assembly, they will move slightly in the direction of the force but will not come apart as the gap 239 between the inner surface of the core top 230 and the disc 238 of the screw 232 is very small compared to the size of the protrusions 212, 222 of external sections 210 and joining plates 220.

FIG. 29a shows the assembled puzzle, (two external segments and two joining plates have been removed for clarity). FIGS. 29b and 29c shows the case as the top layer is rotated 45° and then 90° relative to the bottom and centre layers. All layers move as in the previous embodiment. However, due to the use of a spring 231 to bias the core top 230 whilst allowing it some freedom to move, the puzzle will remain fluid and easy to use despite small imperfections in the manufacturing process. As a result, it will also have a longer life expectancy.

A further embodiment of the present invention provides another related method for enabling sections of the surface of a sphere or other 3D object to move relative to each other, for use as a puzzle or in the engineering applications described above.

Externally, this puzzle resembles that of FIG. 1 and the eight external pieces may be moved relative to each other in the same way. However, the internal mechanism which enables this is different and is shown in FIGS. 30 to 39.

This puzzle 300 comprises a primary external segment 310 and seven secondary external segments 320 which are adapted to be able to move in a prescribed fashion around a central core made from two separate pieces, 330 and 340. In this embodiment, rather than using joining pieces, the moving secondary external segments 320 slidably cooperate with protrusions fixed to the central core.

Primary external segment 310 is a part-spherical shell with three raised portions 311 on the inside as seen in FIG. 31. These raised portions 311 are complimentary in size and shape to recesses 331 in core element 330 showin in FIG. 33b to which they may be joined, e.g. by ultrasonic welding.

Secondary external elements 320 are all identical except of the pattern application on their surface, each is part-spherical in shape, hollowed towards the centre and has channels 321 on three sides leaving a triangular joining piece 322 in the centre which will hold together the outer shell 323 and inner shell 324 together as seen in FIGS. 32a and 32b.

The inner shells 324 are smaller in size than the outer shells 323 by the size of the (radius+small tolerance) of the cylindrical supports 336, 346 in the core halves 330, 340. This allows the inner shells 324 to bypass these supports and enables them to free rotate freely. The outer shells 323 are identical in shape and size to primary external segment 310.

In this embodiment the core comprises two hemispherical elements 330 and 340.

Core portion 330, shown in FIG. 33, is based around a hollow hemispherical body, 331 which has a core cap 332 that resembles a square cut out of the surface of a sphere. Core cap 332 has a cylindrical stem 336 for joining to the body 331 and a recess 631 at its top north-east corner for joining to a raised portion 311 of the primary external segment 310.

Further core caps 333 and 334 have further recesses for joining to primary external segment 310. Core caps 335 (of which there are two) do not. Core caps 333, 334 and 335 also have male adapters 337 which mate with corresponding female adapters 347 in the second core segment 340. A flange 338 mates with a corresponding groove 348 in the second core portion 340.

Core caps 333, 334 and 335 are joined to the body of the core by semicylindrical members 339 which join with corresponding members 349 on the second core portion 340.

Second core portion 340 shown in FIG. 34 corresponds with first core portion 330 except that the primary external segment 310 does not bind to this portion and so no recesses are required for this binding.

Once external segment 310 has been bound to first core portion 330, three secondary external segments 320 can readily be fitted as shown in FIG. 35, sliding into place by means of their channels 321. Outer shells 323 can readily slide over core caps 332–335, 432–433 whilst inner shells 324 will readily slide underneath the core caps.

Figure 35A:
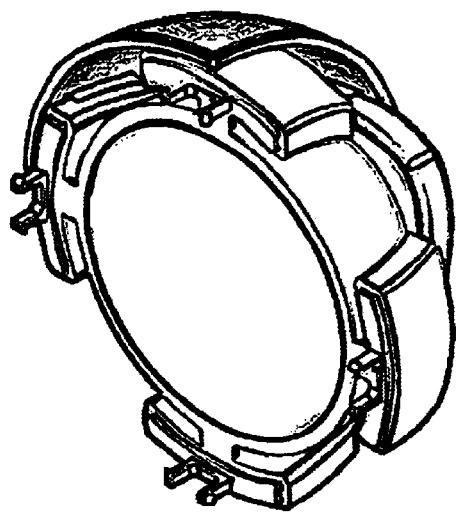
Figure 35B:
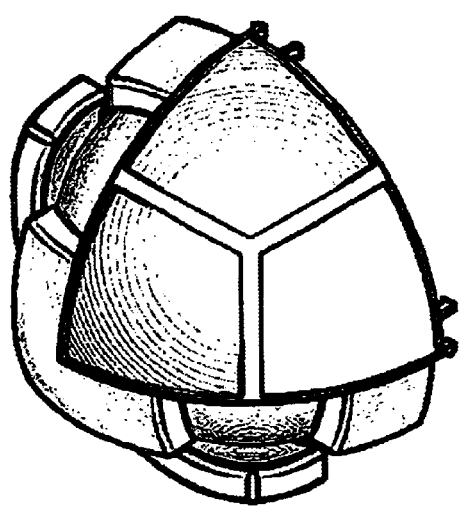
Figure 35C:
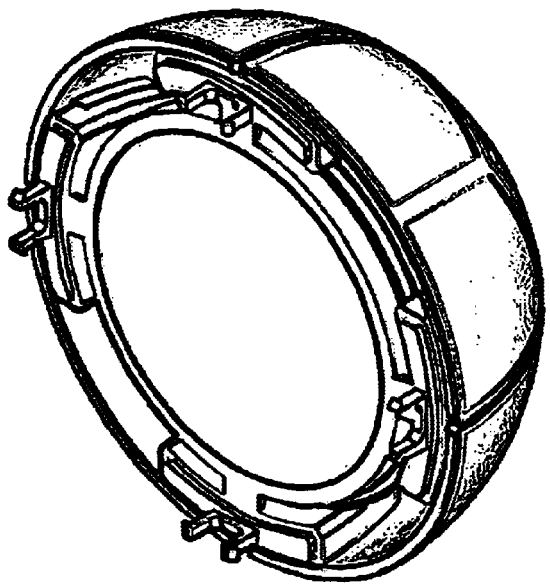
Figure 35D:
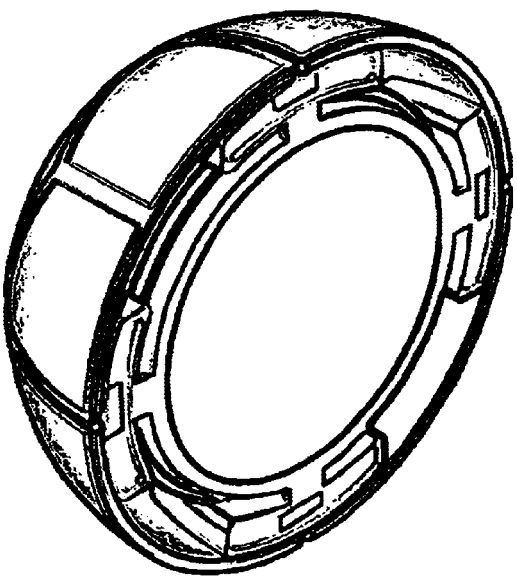

Since the distance between any two end points in the inner shells 324 is smaller than the distance between any two-core caps supports 336, 339, 346, 349 they can bypass these supports and slide into their designated positions as seen in FIG. 35d completing a full hemisphere.

A second half hemisphere can be assembled correspondingly on core portion 340. The two halves of the ball are then clipped together as seen in FIG. 36, giving a sphere with eight segments without a visible centre. The core caps will act to hold the external segments 320 in contact with the puzzle. The provision of a fixed primary external segment allows part of the puzzle to be held in place whilst groups of four segments are moved relative to each other FIGS. 37a, 37b, 38b, 38b, 39a, 39b illustrate further how the parts interact with each other, being free to move in the same manner as the first embodiment, but also held so that they will not be dislodged.

The capabilities of this mechanism to rotate the external segments relative to each other are the same as in the first embodiment. The theory and mechanism of the puzzle can be applied to other shapes; for example, the eight external segments could be shaped like eight part-cubes, giving the puzzle an overall cubic appearance.

This puzzle can be developed further to provide a puzzle with thirty-two segments as illustrated in FIGS. 40 to 46.

This puzzle 400 has at its heart one primary external element 410 and seven secondary external elements 420. These are analogous to the equivalent parts of the previous embodiment and interface with each other and the two parts of the hemispherical core in the same way.

However, each external element 410, 420 has only a small portion of its external surface 411, 421 visible.

However, each external element 410, 420 has a part cubical outer face and has rails 412, 422 which correspond with grooves 451 in twenty-four outermost elements 450 which slidably attach to the rails.

FIG. 45 shows how the puzzle can again be assembled in two separate halves which are then clipped together.

When assembled, there is formed a sphere where any sixteen segments will turn against the other sixteen segments as follows:

Top sixteen against bottom sixteen and vice versa;
Right sixteen against left sixteen and vice versa; and
Front sixteen against back sixteen and vice versa.

When the sixteen segments are rotated as described, external segments will exchange places and positions with each other as will outermost segments. Furthermore, individual groups of four outermost segments 420 can rotate independently about axes of the puzzle. This leads to a puzzle with an enormous number of combinations.

It will be clear to one skilled in the art that this thirty-two piece puzzle described in FIGS. 40 to 46 could equally well be made with the eight external segments moving using the mechanism of the first embodiment shown in FIGS. 1 to 11.

FIGS. 47 to 55 show the best mode at the present time for manufacturing the basic eight segment puzzle. This puzzle is an improved form of the eight segment puzzle shown in FIGS. 30 to 39 which is more suitable for manufacturing and is easier to use.

Primary external segment 510 is analogous to primary external segment 310 above. However, it now comprises an outer primary shell 511 shown in FIGS. 47a to 47c and inner primary shell 512 shown in FIG. 48a to 48c. Shallow recesses 513 are used for attaching the segment to the core tops 540, 541 of core 530. There is also a cylinder 514 which mates with a screw 531 that threads through hole 515 for the purposes of attaching the primary external segment 310 to the core 530 as shown in FIG. 53. The inner primary shell 512 has three recesses 516 which mate with the underside of core tops 540, 541. The combined external segment 310 therefore sandwiches core tops 540 or 541 between the inner and outer primary shells. As in the design of FIG. 30 to 39, this primary external segment 310 is fixed relative to the core. The benefit of this approach for fixing the external segment in place is that it is easier and more reliable to manufacture than using e.g. ultrasonic welding.

Secondary external segment 520 is analogous to secondary external segment 320 above; however is has been modified as shown in FIGS. 49a to 49c and 50a to 50c. This comprises an outer secondary shell 521 and an inner secondary shell 522.

The outer secondary shell 521 has a triangular male formation 523 which defines grooves 524 therebetween. The inner secondary shell 522 has shallow recesses 525 and rails 526 which define a triangular female formation 527 therebetween. At the centre there is a tube 528. FIGS. 54a and 54b are cross-sections of the outer and inner secondary shells when assembled.

The triangular male formation 523 cooperates with the triangular female formation 527 with the grooves 524 cooperating with the rails 526. This prevents the inner and outer secondary shells rotating relative to each other. However, they are held together by a compression spring 529 which fits around tube 528b. It is held in place and compressed by the disc of a screw 550 which screws into cylinder 528b. This spring 529 acts to bias the inner and outer secondary screws into contact with each other leaving no gap as in FIG. 54a.

This makes the distance between points 552 (inner surface of the outer secondary shell) and 553 (outer surface of the inner secondary shell) as shown in FIG. 54a slightly shorter than the distance between 554 (outer surface of core top 540 or 541) and 555 (inner surface of core top 540 or 541).

Therefore a little force is required to separate the inner and outer secondary shells, against the biasing force of spring 529, in order to rotate the segments relative to each other. The separation of the inner and outer secondary shells is made easier by the non-vertical edges of the male triangle formation 523 and the rails 526. The biasing force of the spring 529 will continue to urge the inner and outer secondary shells towards each other whilst they are apart during rotation, ensuring smooth rotation of all elements of the puzzle and also adapting for any small distortions in the shape of the various pieces.

The shallow recesses 525 combined with the tension in the spring 592 combine to cause an audible and tactile click every 90° rotation of the segments, irrespective of the plane or direction of the rotation, as the inner and outer secondary shells spring back into contact with each other.

Assembly of the core 530 is shown in FIGS. 51a, 51b, 52a and 52b. The core comprises first and second portions 532 and 533, two of each portion being required. Cross-shaped portion 532 has two tongues 534 and two corresponding grooves 535. By facing two cross-shaped portions towards each other, orientated at 90° to each other, the tongues 534 and grooves 535 can be mated with each other forming a single piece further held together by hooks 536 which each grip around the arms of the other cross-shaped portion 532.

The core is completed by the addition of two of the second core portion 533. This is screwed in place by a screw 537 which passes through hole 538 and is guided by a protruding square 539 which mates with a corresponding hollow in core portion 533.

It will be seen that core tops 540 are the top surface of second core portion 533 and core tops 541 are formed in two halves from mating core portions 532.

FIG. 53 shows a primary external segment 510 being fitted in place with screw 531. Three secondary external segments 520 can then be readily fitted in place. A second half core is assembled with four secondary external segments and the two halves are then clipped together irreversibly, forming the puzzle.

Further modifications and improvements may be incorporated without departing from the scope of the invention herein intended.

What is claimed is:

1. A three-dimensional object comprising a core having a plurality of core tops, and a plurality of external segments, wherein the external segments have formations arranged thereon to slidably cooperate with corresponding formations on the core, in which the external segments are moveable relative to one another in such a way as to enable individual groups of external segments to be exchanged with one another, and the external segments comprise an inner shell and an outer shell connected by a joining piece and the inner shell and the outer shell are adapted to sandwich edges of the core tops therebetween.

2. The three-dimensional object according to claim 1 wherein the inner and outer shells are separably joined and urged together by a spring.

3. The three-dimensional object according to claim 2 wherein the distance between the inner and outer shells, when together, is less than the thickness of a core top edge.

4. The three-dimensional object according to claim 2 wherein an external segment has a recess adapted such that when the external segments are moved into a home position, the spring urges the inner and outer shells to cooperate with the core top and so make an audible and/or tactile click.

5. The three-dimensional object according to claim 1 wherein a further external segment is provided, the further external segment being held in a fixed relation to the core.

6. The three-dimensional object according to claim 5 wherein there are seven external segments, and one further external segment.

7. The three-dimensional object according claim 1 whereupon the external segments are configured to each receive three outermost segments which have part of the surface of the object thereon, the external segments being adapted to cooperate with adjacent external segments and thereby form a circular track around which the outermost segments may move.

8. The three-dimensional object according to claim 1 wherein the core is formed from two separate part-cores having corresponding connectors.

9. A puzzle comprising the three-dimensional object according to claim 1, wherein parts of the surface of the object have pattern elements or shapes thereon.

* * * * *